US011033985B2

(12) United States Patent
Abdolvand

(10) Patent No.: US 11,033,985 B2
(45) Date of Patent: Jun. 15, 2021

(54) METHOD OF, AND APPARATUS FOR, REDUCING PHOTOELECTRON YIELD AND/OR SECONDARY ELECTRON YIELD

(71) Applicant: University of Dundee, Dundee (GB)

(72) Inventor: Amin Abdolvand, Dundee (GB)

(73) Assignee: UNIVERSITY OF DUNDEE, Dundee (GB)

( * ) Notice: Subject to any disclaimer, the term of this patent is extended or adjusted under 35 U.S.C. 154(b) by 525 days.

(21) Appl. No.: 15/739,062

(22) PCT Filed: Jun. 24, 2016

(86) PCT No.: PCT/GB2016/051909
§ 371 (c)(1),
(2) Date: Dec. 21, 2017

(87) PCT Pub. No.: WO2016/207660
PCT Pub. Date: Dec. 29, 2016

(65) Prior Publication Data
US 2018/0178319 A1    Jun. 28, 2018

(30) Foreign Application Priority Data

Jun. 24, 2015  (GB) .................................... 1511153
Jun. 24, 2015  (GB) .................................... 1511154

(Continued)

(51) Int. Cl.
*B23K 26/00* (2014.01)
*B23K 26/0622* (2014.01)
(Continued)

(52) U.S. Cl.
CPC ...... *B23K 26/3584* (2018.08); *B23K 26/0006* (2013.01); *B23K 26/0624* (2015.10);
(Continued)

(58) Field of Classification Search
CPC ............ B23K 26/3584; B23K 26/0624; B23K 26/082; B23K 26/352; B23K 26/0006;
(Continued)

(56) References Cited

U.S. PATENT DOCUMENTS 5,483,038 A    1/1996  Ota et al.
6,407,363 B2 *  6/2002  Dunsky ................. B23K 26/02
                                                 219/121.71
(Continued)

FOREIGN PATENT DOCUMENTS

CN    102369081    3/2012
CN    102792193    11/2012
(Continued)

OTHER PUBLICATIONS

PLUS Search conducted internally by the USPTO "STIC Search" Team for Andrew Bainbridge from a request dated Sep. 28, 2020. (Year: 2020).*

(Continued)

*Primary Examiner* — Paul R Durand
*Assistant Examiner* — Andrew P Bainbridge
(74) *Attorney, Agent, or Firm* — Myers Bigel, P.A.

(57) ABSTRACT

A method of reducing photoelectron yield (PEY) and/or secondary electron yield (SEY) of a surface of a target (10), comprises applying laser radiation to the surface of the target (10) to produce a periodic arrangement of structures on the surface, wherein the laser radiation comprises pulsed laser radiation comprising a series of laser pulses and the power density of the pulses is in a range 0.01 TW/cm$^2$ to 3 TW/cm$^2$, optionally 0.1 TW/cm$^2$ to 3 TW/cm$^2$.

25 Claims, 35 Drawing Sheets

Evolution of SEY coefficient as a function of the primary energy for the three different samples: reference (blue lines), stored (red lines), degreased after storage (green lines).

(30) Foreign Application Priority Data

| Sep. 30, 2015 | (GB) | ................................. | 1517232 |
|---|---|---|---|
| Sep. 30, 2015 | (GB) | ................................. | 1517235 |
| Mar. 8, 2016 | (GB) | ................................. | 1603991 |

(51) Int. Cl.

| B23K 26/082 | (2014.01) |
|---|---|
| B23K 26/352 | (2014.01) |
| B23K 103/04 | (2006.01) |
| B23K 103/06 | (2006.01) |
| B23K 103/10 | (2006.01) |
| B23K 103/12 | (2006.01) |
| B23K 103/14 | (2006.01) |

(52) U.S. Cl.

CPC .......... *B23K 26/082* (2015.10); *B23K 26/352* (2015.10); *B23K 2103/05* (2018.08); *B23K 2103/06* (2018.08); *B23K 2103/10* (2018.08); *B23K 2103/12* (2018.08); *B23K 2103/14* (2018.08)

(58) Field of Classification Search

CPC ............ B23K 2310/10; B23K 2310/05; B23K 2310/12; B23K 2310/06; B23K 2310/14

USPC ................................................... 219/121.69

See application file for complete search history.

(56) References Cited

U.S. PATENT DOCUMENTS

| 6,518,540 | B1 | 2/2003 | Wee et al. | |
|---|---|---|---|---|
| 6,670,571 | B2 | 12/2003 | Dance | |
| 7,628,865 | B2* | 12/2009 | Singh | ..................... G21K 1/003 |
| | | | | 134/1 |
| 8,743,165 | B2* | 6/2014 | Sandstrom | ........... B23K 26/032 |
| | | | | 347/225 |
| 9,409,254 | B2 | 8/2016 | Hackel | |
| 9,413,137 | B2* | 8/2016 | Haden | ................... H01S 5/0428 |
| 10,315,278 | B2 | 6/2019 | Wang et al. | |
| 2007/0199927 | A1 | 8/2007 | Gu | |
| 2007/0236130 | A1 | 10/2007 | Ito et al. | |
| 2008/0216926 | A1 | 9/2008 | Guo | |
| 2009/0268265 | A1 | 10/2009 | Shah et al. | |
| 2010/0176101 | A1 | 7/2010 | Costin et al. | |
| 2011/0089039 | A1 | 4/2011 | Nashner | |
| 2012/0015118 | A1 | 1/2012 | Zheludev | |
| 2012/0018993 | A1 | 1/2012 | Boegli | |
| 2012/0243094 | A1 | 9/2012 | Boegli | |
| 2013/0017948 | A1 | 1/2013 | Charlson | |
| 2013/0020297 | A1 | 1/2013 | Gupta | |
| 2013/0083500 | A1 | 4/2013 | Prest | |
| 2013/0126573 | A1 | 5/2013 | Hosseini et al. | |
| 2013/0143013 | A1 | 6/2013 | Reichenbach | |
| 2013/0208074 | A1 | 8/2013 | Zhang | |
| 2013/0251960 | A1* | 9/2013 | Zhang | .................. C25D 11/243 |
| | | | | 428/195.1 |
| 2014/0083984 | A1 | 3/2014 | Gerke | |
| 2014/0147694 | A1 | 5/2014 | Harrison | |
| 2014/0154526 | A1 | 6/2014 | Guo | |
| 2014/0175067 | A1 | 6/2014 | Reichenbach et al. | |
| 2014/0185065 | A1 | 7/2014 | Shah | |
| 2015/0049593 | A1 | 2/2015 | Oliveira | |
| 2015/0290744 | A1 | 10/2015 | Bilhe et al. | |
| 2016/0167170 | A1 | 6/2016 | Terasaki et al. | |
| 2016/0169531 | A1 | 6/2016 | Wagner et al. | |
| 2017/0021654 | A1 | 1/2017 | Bilhe et al. | |
| 2017/0292190 | A1 | 10/2017 | Montero et al. | |
| 2018/0142338 | A1 | 5/2018 | Yokota et al. | |
| 2018/0178319 | A1* | 6/2018 | Abdolvand | .......... B23K 26/082 |
| 2018/0238178 | A1 | 8/2018 | Lampenscherf et al. | |

FOREIGN PATENT DOCUMENTS

| CN | 103586578 | | 2/2014 | |
|---|---|---|---|---|
| EP | 2338681 | | 6/2011 | |
| GB | 2527291 | A | 12/2015 | |
| JP | 2000311632 | A | 11/2000 | |
| JP | 2002287191 | | 10/2002 | |
| JP | 2002287191 | A | 10/2002 | |
| JP | 2013529548 | A | 7/2013 | |
| JP | 2014133263 | A | 7/2014 | |
| KZ | 18694 | | 12/2009 | |
| KZ | 17540 | | 1/2010 | |
| KZ | 23611 | | 12/2010 | |
| RU | 2094225 | | 10/1997 | |
| RU | 2268814 | | 1/2006 | |
| RU | 2433896 | | 11/2009 | |
| RU | 2447012 | | 4/2012 | |
| WO | 2013151451 | | 10/2013 | |
| WO | 2015189645 | | 12/2015 | |
| WO | WO20151899645 | A1 * | 12/2015 | ............ B23K 26/36 |

OTHER PUBLICATIONS

Examination Report dated Mar. 13, 2019 for European Application No. 16741107.3 (5 pages).
"Ultra-Intense Laser Blast Creates True 'Black Metal'", Rochester News, University of Rochester, Nov. 21, 2006 (2 pages).
Baglin, "The Secondary Electron Yield of Technical Materials and its Variation with Surface Treatments", Proceedings of EPAC 2000, Vienna, Austria, pp. 217-221).
Cern Bulletin, Issue No. 24-25/2014, Jun. 9, 2014, Particle Kickers (2 pages).
Chunlei Guo, group webpage, http://www2.optics.rochester.edu/workgroups/guo/about.html, (2 pages).
Dominguez et al., "First Electron-Cloud Studies at the Large Hadron Collider", Physical Review Special Topics—Accelerators and Beams, 16, 011003-1-011003-18, (2013).
Ducimetiere et al., "The LHC Injection Kicker Magnet", Proceedings of the 2003 Particle Accelerator Conference, pp. 1162-1164.
Fan et al., "Rapid Fabrication of Surface Micro/Nano Structures with Enhanced Broadband Absorption on Cu by Picosecond Laser", Optics Express, vol. 21, No. 10, May 20, 2013, pp. 11628-11637.
Goudket et al., "Surface Resistance RF Measurements of Materials Used for Accelerator Vacuum Chambers", 6th International Particle Accelerator Conference, IPAC2015 Richmond, VA, pp. 3235-3238.
John H. Booske, "Plasma Physics and Related Challenges of Millimeter-Wave-to-Terahertz and High Power Microwave Generation", Physics of Plasmas, 15, 055502-1-055502-16 (2008).
Li et al., "Influence of Surface Morphology on Corrosion and Electronic Behavior", Acta Materialia, 54, pp. 445-452, (2006).
PCT International Search Report and Written Opinion issued for corresponding International Application No. PCT/GB2016/051908, dated Oct. 7, 2016 (14 pages).
PCT International Search Report and Written Opinion issued for corresponding International Application No. PCT/GB2016/051909, dated Oct. 12, 2016 (14 pages).
PCT International Search Report and Written Opinion issued for corresponding International Application No. PCT/GB2017/050621, dated Jul. 13, 2017 (12 pages).
Penide et al., "High Contrast Laser Marking of Alumina", Applied Surface Science, 336 (2015), pp. 118-128.
Pivi et al., "Sharp Reduction of the Secondary Electron Emission Yield from Grooved Surfaces", Journal of Applied Physics, 104, 104904-1-104904-10.
Tang et al., "Nanosecond Pulsed Laser Blackening of Copper", Applied Physics Letters, 101, 231902-1-231902-4, (2012).
Valizadeh et al., "Low Secondary Electron Yield Engineered Surface for Electron Cloud Mitigation", Applied Physics Letters, 105, 231605-1-231605-5 (2014).
Valizadeh et al., "Low Secondary Electron Yield of Laser Treated Surfaces Copper, Aluminium and Stainless Steel", Proceedings of IPAC2016, Busan, Korea, pp. 1089-1092.
Vorobyev et al., "Colorizing Metals with Femtosecond Laser Pulses", Applied Physics Letters, 92, 041914-1-041914-3, (2008).

(56) References Cited

OTHER PUBLICATIONS

Vorobyev et al., "Enhanced Absorptance of Gold Following Multipuise Femtosecond Laser Ablation", Physical Review B, 72, 195422-1-195422-5 (2005).

Vorobyev et al., "Enhanced Absorption of Metals Over Ultrabroad Electromagnetic Spectrum", Applied Physics Letters, 95, 121106-1-121106-3 (2009).

Vorobyev et al., "Femtosecond Laser Blackening of Platinum", Journal of Applied Physics, 104, 053516-1-053516-4, (2008).

Walker et al., "The Secondary Electron Emission Yield for 24 Solid Elements Excited by Primary Electrons in the Range 250-5000 ev: A Theory/Experiment Comparison", Scanning vol. 30, pp. 365-380, (2008).

Yang et al., "Ultra-Broadband Enhanced Absorption of Metal Surfaces Structures by Femtosecond Laser Pulses", Optics Express, vol. 16, No. 15, Jul. 21, 2008, pp. 11259-11265.

Russian Office Action and Search Report corresponding to RU 2018102523, dated Dec. 23, 2019 (11 pages to include English translation of Search Report).

PCT International Search Report, dated Oct. 12, 2016, for corresponding PCT International Application No. PCT/GB2016/051909 (5 pages).

PCT International Written Opinion of the International Searching Authority, dated Oct. 12, 2016, for corresponding PCT International Application No. PCT/GB2016/051909 (6 pages).

Baglin et al. "The Secondary Electron Yield of Technical Materials and its Variation with Surface Treatments", Sep. 23, 2000, XP055217353, Retrieved from the Internet: URL:http://cds.cern.ch/record/466534.

Indian Office Action corresponding to IN 201817037125; dated Oct. 27, 2020 (8 pages).

\* cited by examiner

Other examples of *TYPE C (LESS)-Tophat pyramids* surfaces with power densities in [TW/cm²] of (a) = 0.54; (b) = 0.38; (c) = 0.28; (d) = 0.22; (e) = 0.16

(a) and (b)

(c) and (d)

(e)

and example of *Type C (LESS) – lines* surfaces with power densities in [TW /cm²] of 0.4 and another example of *Type C (LESS) – lines* surfaces with power densities in [TW/cm²] of 0.2

A thickness of approximately 50 μm was affected by the texturizing

Sample S003_a_Cu_laser_good. SEY as a function of primary energy on Esca5400 system, three random points on the sample Type AC (532) surface Type C1 (grooves) with shallow cavities
Power Density = 0.16, 0.22, 0.28 TW/cm²
SEY = 1

Note: our high contrast marking parameter

Summary

- Type «C grooves with deep cavities» has an SEY almost as good as type «C top-hat pyramids with deep cavities» (a.k.a. our usual type «C»)

- Outgassing as measured by Ivo on type «C top-hat pyramids with deep cavities» was reasonable. We expect that outgassing on sample treated with grooves only should be better Sample S005_Cu_2015.06.01_13mm_disc 1,
SEY as a function of primary energy on both systems Sample S005_Cu_2015.06.01_13mm_disc 2,
SEY as a function of primary energy on both systems Details of the a) 'as-received' sample mounted on the sample holder for SEY measurement; b) samples measured after 5 months of storage (left-hand side) and after performing a NGL chemical degreasing (right-hand side).

Cu_2015.10.11_2x12cm_stored (left), and Cu_2015.10.11_2x12cm_degreased (right) SEY as a function of the primary energy on 5 random points of each sample.

SEY Comparison of samples Cu_2015.10.11_2x12cm_stored (red lines) and Cu_2015.10.11_2x12cm_degreased (green lines).

XPS analysis comparison of samples Cu_2015.10.11_2x12cm_stored (red line) and Cu_2015.10.11_2x12cm_degreased (green line).

Evolution of SEY coefficient as a function of the primary energy for the three different samples: reference (blue lines), stored (red lines), degreased after storage (green lines).

Visual observations of a) Cu-OFE LESS sample as received, b) after cutting and c) Specimen identification Summary of the optical microscope observation of various specimens before and after cleaning SEM SE2 images of various specimens under study after cleaning

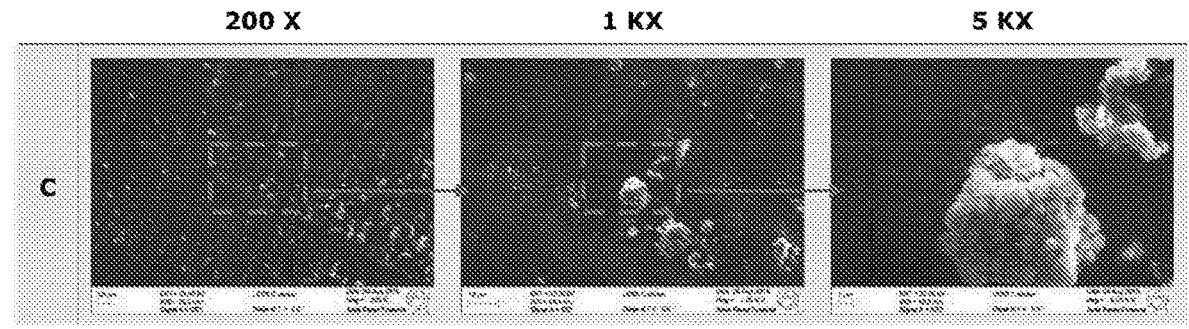
SEM SE2 images of carbon sticker surface where the characteristic cauliflower observed in LESS surface are visible
Fig. 36
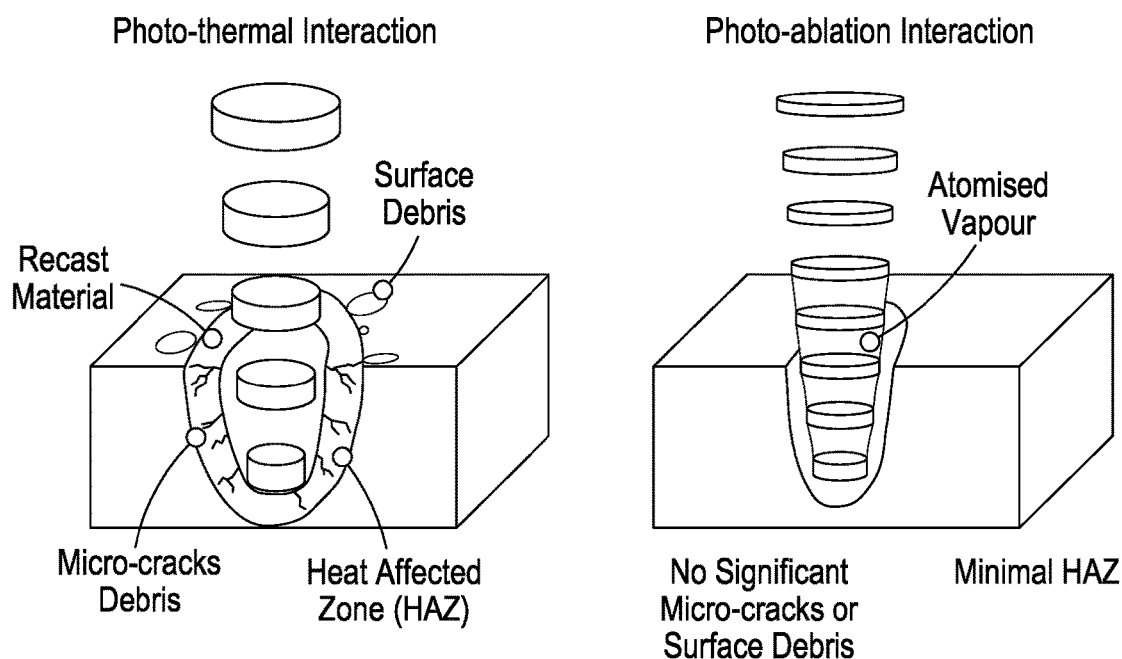
Fig. 37a
Fig. 37b

US 11,033,985 B2

METHOD OF, AND APPARATUS FOR, REDUCING PHOTOELECTRON YIELD AND/OR SECONDARY ELECTRON YIELD

RELATED APPLICATIONS

This application is a 35 U.S.C. § 371 national stage application of PCT Application No. PCT/GB2016/051909, filed on Jun. 24, 2016, which claims priority from Great Britain Patent Application Nos. 1511154.5, filed on Jun. 24, 2015, 1511153.7, filed on Jun. 24, 2015, 1517235.6, filed on Sep. 30, 2015, 1517232.3, filed on Sep. 30, 2015, and 1603991.9, filed on Mar. 8, 2016, the contents of which are incorporated herein by reference in their entireties. The above-referenced PCT International Application was published in the English language as International Publication No. WO 2016/207660 A1 on Dec. 29, 2016.

The present invention relates to methods of treating surfaces in order to reduce photoelectron yield (PEY) and/or secondary electron yield (SEY).

BACKGROUND

Photoelectron emission (PEE) refers to the emission of electrons due to interaction of photons with a surface. Secondary electron emission (SEE) refers to emission of a secondary electron from a surface due to interaction of a primary electron with the surface. Photoelectron yield (PEY) can be used to characterise PEE and secondary electron yield (SEY) can be used to characterise SEE. PEY and SEY may be taken to be the average number of emitted electrons per single incident photon or electron respectively.

PEE and SEE effects can cause significant difficulties in a wide variety of apparatus, for example in particle accelerators, beamlines, waveguides, for example r.f. waveguides, detectors, spacecraft, and vacuum chambers. PEE and SEE effects can lead, variously, to undesired electron cloud build-up, undesired increases in pressure, beam losses and instability, reduction in beam lifetimes, undesired heat loads, power loss, damage, reduction in apparatus lifetime, increase in noise, and decrease in sensitivity, depending on the particular type of apparatus and application in question.

It is desired to provide improved or at least alternative methods for reducing PEY and SEY.

SUMMARY

In a first aspect of the invention there is provided a method of reducing photoelectron yield (PEY) and/or secondary electron yield (SEY) of a surface, comprising:
applying laser radiation to the surface to produce a periodic arrangement of structures on the surface, wherein
the laser radiation comprises pulsed laser radiation comprising a series of laser pulses and the power density of the pulses is in a range 0.01 TW/cm$^2$ to 3 TW/cm$^2$, optionally 0.1 TW/cm$^2$ to 3 TW/cm$^2$.

Optionally the power density may be in a range 0.1 TW/cm$^2$ to 2 TW/cm$^2$, optionally in a range 0.3 TW/cm$^2$ to 2 TW/cm$^2$, optionally in a range 0.4 TW/cm$^2$ to 1.5 TW/cm$^2$, further optionally in a range 0.38 TW/cm$^2$ to 0.6 TW/cm$^2$, 0.16 TW/cm$^2$ to 0.54 TW/cm$^2$.

By using laser pulses having such power densities, a periodic arrangement of structures that provides a surface with desired properties may be obtained. For example a surface having a desired value or range of values of secondary electron yield (SEY) may be obtained.

The method may alter the properties of surface such that the surface has a value of SEY less than 1.5, optionally less than 1.2, optionally less than 1.0, optionally less than or equal to 0.7, optionally in a range 0.2 to 1.0, optionally in a range 0.5 to 1.0, optionally in a range 0.3 to 0.9, optionally in a range 0.6 to 0.8, optionally approximately equal to 0.7. The values of SEY may be values immediately after applying of the laser radiation, for example before any build-up of grease, dirt, oxides or other contaminants or extraneous materials, and/or after cleaning.

The laser pulses may have a duration less than a thermal relaxation time of the material of the surface. The laser pulses may have a duration such that the electrons and the atomic lattice of the material of the surface have a substantially different temperature substantially throughout application of the laser pulses. The laser pulses may have a duration such that material of the surface is at least one of evaporated or vaporised or removed without substantial melting and/or flowing of the surface. The laser pulses may have a duration such that some material of the surface is at least one of evaporated or vaporised or removed without substantial melting and/or flowing of the remaining material of the surface.

A pulse duration of the laser pulses may be in a range 200 femtoseconds (fs) to 1000 picoseconds (ps).

The periodic arrangement of structures on the surface may comprise a periodic series of peaks and troughs substantially parallel to each other, and the peaks may be substantially flat on top and/or may be rounded on top and/or may have substantially no pointed and/or or sharp regions on top. The peaks may substantially have a top hat shape and/or a truncated pyramidal shape, for example a top hat shape and/or a truncated pyramidal shape in cross-sectional profile. Thus, for example, a desired value of electron work function and/or desired electron trapping properties may be obtained. The peaks may extend in a longitudinal direction and may be referred to as ridges.

The peak to trough distance for at least some of the peaks, and/or an average or median peak to trough distance, may be in a range 500 nm to 100 μm, optionally 5 μm to 100 μm, optionally in a range 20 μm to 80 μm, optionally in a range 1 μm to 60 μm, optionally in a range 30 μm to 60 μm.

The periodic arrangement of structures may comprise a cross-hatched arrangement or an arrangement of substantially parallel lines of peaks and troughs (for example, ridges and valleys) substantially without cross-hatching. The periodic arrangement of structures may, for example, be produced by a single pass of a laser source that provided the laser radiation.

The surface may be on an at least one underlying layer (for example, at least one of steel, stainless steel) and the laser radiation may be such as to substantially not remove or move material of the surface in such a way as to expose the underlying layer.

The method may further comprise at least one of degreasing, cleaning or smoothing said surface after the applying of the laser radiation, and/or performing a surface carbon reduction process with respect to said surface after the applying of the laser radiation.

In a further aspect of the invention, which may be provided independently, there is provided a method of reducing photoelectron yield (PEY) and/or secondary electron yield (SEY) of a surface, comprising:
applying laser radiation to the surface to produce a periodic arrangement of structures on the surface, wherein the laser radiation comprises pulsed laser radiation comprising a series of laser pulses; and at least one of degreasing, cleaning or smoothing said surface after the applying of the laser radiation, and/or performing a surface carbon reduction process with respect to said surface after the applying of the laser radiation.

The cleaning may comprise performing a chemical cleaning process or using an extraction unit, for example a process to remove materials adhered to or otherwise present at or in the surface, for example by way of dissolving, flushing, scouring and/or reacting with such materials, or by using an inert gas (for example nitrogen) blower, pressure cleaner or air gun.

In a further aspect of the invention, which may be provided independently, there is provided a laser treated surface comprising a laser-formed periodic arrangement of structures on the surface, wherein at least one of:
 the periodic arrangement of structures comprises a periodic series of peaks and troughs substantially parallel to each other;
 the periodic arrangement of structures comprises a cross-hatched, periodic series of peaks and troughs; and optionally
 the peaks may be substantially flat on top and/or may be rounded on top and/or may have substantially no pointed and/or or sharp regions on top and/or the peaks may substantially have a top hat shape and/or a truncated pyramidal shape, for example a top hat shape and/or a truncated pyramidal shape in cross-sectional profile; and/or
 the peak to trough distance for at least some of the peaks, and/or an average or median peak to trough distance, may be in a range 500 nm to 100 μm, optionally in a range 5 μm to 100 μm, optionally in a range 20 μm to 80 μm, optionally in a range 1 μm to 60 μm, optionally in a range 30 μm to 60 μm.

In a further aspect of the invention, which may be provided independently, there is provided an apparatus for reducing photoelectron yield (PEY) and/or secondary electron yield (SEY) of a surface, comprising:
 a laser source for applying pulsed laser radiation to a surface; and
 a laser controller configured to control the laser source to apply the laser radiation as a series of laser pulses thereby to form a periodic arrangement of structures on the surface, wherein the power density of the pulses is in a range 0.01 TW/cm$^2$ to 3 TW/cm$^2$, optionally 0.1 TW/cm$^2$ to 3 TW/cm$^2$.

In a further aspect of the invention, there is provided a method of reducing photoelectron yield (PEY) and/or secondary electron yield (SEY) of a surface, comprising:
 applying laser radiation to the surface to produce a periodic arrangement of structures on the surface, wherein
 the laser radiation comprises pulsed laser radiation comprising a series of laser pulses, and a pulse duration of the laser pulses is in a range 200 femtoseconds (fs) to 1000 picoseconds (ps).

The surface may be the surface of a target.

The pulse duration may be in a range 1 ps to 100 ps. The pulse duration may be in a range 1 ps to 50 ps. The pulse duration may be in a range 5 ps to 500 ps The laser radiation may comprise a pulsed laser beam that has a focal spot diameter on the surface in a range 1 μm to 50 μm or in a range 1 μm to 100 μm.

The pulsed radiation may have a pulse repetition rate in a range 10 kHz to 1 MHz.

An average power of the laser radiation may be in a range 0.3 W to 20 W, optionally in a range 0.3 W to 2 W, or in a range 1 W to 10 W, or in a range 1 W to 5 W, or in a range 0.1 W to 1 W, or in a range 0.1 W to 2 W, or in a range 0.3 W to 5 W.

The applying of the laser radiation to the surface may comprise scanning a pulsed laser beam over the surface, and a scan speed for the scanning may be in a range 1 mm/s to 200 mm/s, optionally in a range 1 mm/s to 100 mm/s.

The scanning of the pulsed laser beam over the surface may be repeated between 2 and 10 times, or may be performed once.

An angle of incidence of the laser radiation to the surface may be in a range from 0 to 30 degrees. The angle of incidence of the laser radiation to the surface may be in a range from 90 degree to 60 degrees.

A wavelength of the radiation may be in a range 100 nm to 2,000 nm, optionally 532 nm or 528 nm or 1030 nm or 1064 nm or 1070 nm.

The structures may comprise peaks and troughs. The periodic arrangement of structures may comprise a periodic series of peaks and troughs. The peaks and troughs may be substantially parallel to each other.

The periodic arrangement of structures may comprise a first series of peaks and troughs arranged in a first direction, and a second series of peaks and troughs arranged in a second, different direction. The first and second directions may be substantially orthogonal. The first series of peaks and troughs and the second series of peaks and troughs may intersect such that the periodic arrangement of structures comprises a cross-hatched arrangement.

A period of the periodic arrangement may be in a range 0.5 μm to 100 μm. The separation of adjacent peaks (or troughs) of the periodic structure may be in a range 0.5 μm to 100 μm. A hatch distance of the cross-hatched arrangement may be in a range 0.5 μm to 100 μm.

The laser radiation may be such that the applying of the laser radiation to the surface comprises producing further structures. The further structures may be smaller than the structures of the periodic arrangement of structures.

That feature may be particularly important, so in a further aspect of the invention, which may be provided independently, there is provided a method of reducing photoelectron yield (PEY) and/or secondary electron yield (SEY) of a surface, comprising:
 applying laser radiation to the surface to produce a periodic arrangement of structures on the surface, wherein
 the laser radiation comprises pulsed laser radiation comprising a series of laser pulses, and the laser radiation is such as to produce further structures on the surface as well as the periodic arrangement of structures.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 μm, optionally in a range 100 nm to 1 μm.

The further structures may cover at least part of the periodic array of structures. The further structures may be formed in the troughs and/or on the peaks of the periodic arrangement of structures.

The surface may be a metal surface. The surface and/or target may comprise copper, aluminum, stainless steel or titanium. The metal of the metal surface may be a metal selected from copper, aluminum, stainless steel, or titanium. The surface may form part of a laminated structure, for example a laminated target, for instance comprising one of copper, aluminum, stainless steel, titanium and at least one other material, and/or a laminated structure comprising at least two of copper, aluminum, stainless steel, titanium.

The surface may be the surface of a foil. The target may be a foil.

An average or peak fluence or other property of the laser radiation may be above an ablation threshold of the surface and within 105%, optionally 102%, optionally 101% of the ablation threshold.

The pulses may be such that, for each pulse, a plasma is formed at the surface. The plasma may have substantially the same density as underlying material of the surface.

The surface may form part of a particle accelerator, a beamline, a waveguide for example an r.f. waveguide, a detector, a detector apparatus, or a spacecraft.

The surface may comprise or form part of a surface of a vacuum chamber.

The surface may comprise a surface of a component of an apparatus. The apparatus may be selected from: a particle accelerator, a beamline, a waveguide for example an r.f. waveguide, a detector, a detector apparatus, a spacecraft. The method may comprise applying the laser radiation to the surface to produce the periodic arrangement of structures on the surface and then installing the component in the apparatus, or the method may comprise applying the laser radiation to the surface with the component in situ in the apparatus.

The method may comprise applying the radiation using a solid-state laser, optionally the solid state laser comprises a Nd:YVO$_4$ or Nd:YAG or Yb:YAG or Nd:KGW or Nd:KYW or Yb:KGW or Yb:KYW laser, or a pulsed fibre laser, optionally a Yb, Tm or Nd pulsed fibre laser. The applied radiation may comprise the fundamental wavelengths of operation such lasers or their second or third harmonics.

In a further aspect of the invention, which may be provided independently, there is provided an apparatus for reducing photoelectron yield (PEY) and/or secondary electron yield (SEY) of a surface, comprising:
  a laser source for applying pulsed laser radiation to a surface; and
  a laser controller configured to control the laser source to apply the laser radiation as a series of laser pulses having a pulse duration in a range 200 femtoseconds (fs) to 1000 ps, so to produce a periodic arrangement of structures on the surface.

In a further aspect of the invention, which may be provided independently, there is provided an apparatus for reducing photoelectron yield (PEY) and/or secondary electron yield (SEY) of a surface, comprising:
  a laser source for applying pulsed laser radiation to a surface and configured to operate so as to perform a method according to any other aspect.

In a further aspect of the invention, which may be provided independently there is provided a laser treated surface comprising a periodic arrangement of structures on the surface formed using a method according to any other aspect.

In a further aspect of the invention, which may be provided independently, there is provided a laser treated surface comprising a laser-formed periodic arrangement of structures on the surface and further laser-formed structures on the surface.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 µm, optionally in a range 100 nm to 1 µm.

The structures may comprise peaks and troughs. The periodic arrangement of structures may comprise a periodic series of peaks and troughs. The peaks and troughs may be substantially parallel to each other.

The periodic arrangement of structures may comprise a first series of peaks and troughs arranged in a first direction, and a second series of peaks and troughs arranged in a second, different direction. The first and second directions may be substantially orthogonal. The first series of peaks and troughs and the second series of peaks and troughs may intersect such that the periodic arrangement of structures comprises a cross-hatched arrangement.

A period of the periodic arrangement may be in a range 0.5 µm to 100 µm. The separation of adjacent peaks (or troughs) of the periodic structure may be in a range 0.5 µm to 100 µm. A hatch distance of the cross-hatched arrangement may be in a range 0.5 µm to 100 µm.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 µm, optionally in a range 100 nm to 1 µm.

The further structures may cover at least part of the periodic array of structures. The further structures may be formed in the troughs of the periodic arrangement of structures.

The surface may be a metal surface. The surface may comprise copper, aluminum, stainless steel or titanium. The metal of the metal surface may be selected from copper, aluminum, stainless steel, titanium. The surface may form part of a laminated structure, for example a laminated target, for instance comprising one of copper, aluminum, stainless steel, titanium and at least one other material, and/or a laminated structure comprising at least two of copper, aluminum, stainless steel, titanium.

In a further aspect of the invention, which may be provided independently, there is provided a particle accelerator, a beamline, a waveguide, a detector, a spacecraft, or a vacuum chamber that includes a component having a surface according to the fifth aspect or the sixth aspect of the invention.

In further aspects of the invention there are provided a method, a surface, a structure comprising a surface, an apparatus, a component, a particle accelerator, a beamline, a waveguide, a detector, a spacecraft, or a vacuum chamber as described and/or illustrated herein.

Any feature in any one or more of the aspects of the invention may be applied to any other one or more of the aspects of the invention in any appropriate combination.

BRIEF DESCRIPTION OF THE DRAWINGS

Embodiments of the invention are further described hereinafter with reference to the accompanying drawings, in which:

FIGS. 35 and 36 show SEM images of samples that are the subject of Appendix 4; and FIGS. 37a and 37b are schematic illustrations of laser interaction mechanisms.

DETAILED DESCRIPTION

Figure 1:
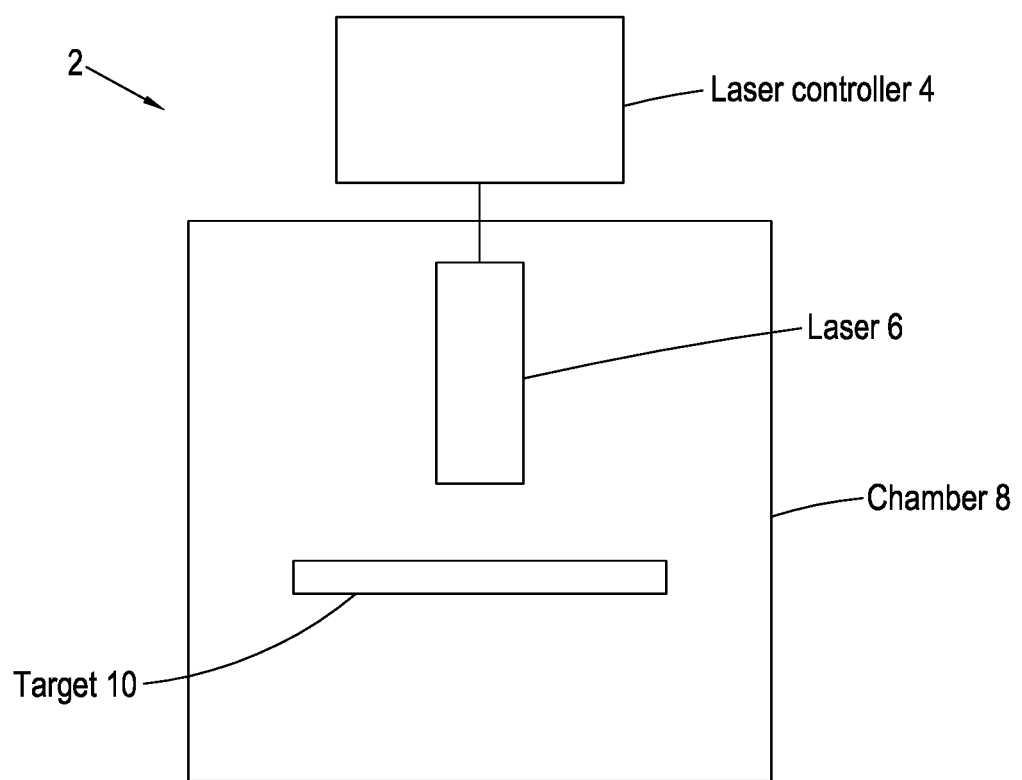
FIG. 1 is a schematic diagram of a system used for laser treatment of a surface to reduce photoelectron emission (PEE) and/or secondary electron emission (SEE) effects, for example to reduce photoelectron yield (PEY) and/or secondary photoelectron yield (SEY)

FIG. 1 shows a system used for laser treatment of a surface to reduce photoelectron emission (PEE) and/or secondary electron emission (SEE) effects, for example to reduce photoelectron yield (PEY) and/or secondary electron yield (SEY).

The system 2 of FIG. 1 comprises a laser 6 connected to a laser controller 6 which is used to control operation of the laser 6 to emit a pulsed laser radiation beam of desired characteristics. The laser 6 is aligned with a target 10 such that operation of the laser 6 under control of the laser controller 4 forms periodic structures on the surface of the target.

In embodiments, the laser may be one of a Nd:YVO$_4$ or Nd:YAG laser, or a pulsed fibre laser, for example a Yb, Tm or Nd pulsed fibre laser. Any other suitable laser may be used in alternative embodiments. In the embodiment of FIG. 1, the wavelength of the pulsed laser radiation is 532 nm, but any other suitable wavelength can be used in other embodiments, for example 528 nm or 1030 nm or 1064 nm or 1070 nm.

The controller may comprise a dedicated controller, or a suitably programmed computer. The controller may be implemented in software, hardware or any suitable combination of hardware and software. In some embodiments, the controller may comprise more ASICs (application specific integrated circuits) or FPGAs (field programmable gate arrays) or other suitable circuitry.

In the embodiment of FIG. 1, the target 10 and laser 6 are located in air and the laser treatment of the surface is performed in air. The target 10 and laser 6 may be positioned in a sealable and/or pumpable chamber 8 that has an associated pump and/or gas supply, and the laser processing of the surface may be performed in vacuum or in desired gaseous conditions, for example in the presence of a selected reactive gas. The chamber 8 is omitted in some embodiments.

In the embodiment of FIG. 1, the target 10 is a metal target comprising copper. Other targets, for example aluminum, stainless steel or titanium can be used.

In operation pulsed laser radiation of desired characteristics is scanned across the surface of the target 10 by the laser 6 under control of the laser controller 4 to produce a periodic arrangement of structures on the surface. For example, in order to form peaks and troughs arranged in parallel rows, the laser beam may be scanned along parallel, spaced-apart paths across the surface to form parallel troughs separated by peaks. Any other suitable arrangements of structures can be formed by suitable scanning of the laser beam over the surface.

Operating parameters of the laser, and certain equations linking such parameters, can be represented as follows, Wavelength ($\lambda$) [m]

Repetition rate of the laser ($\gamma$) [Hz]

Pulse length of the laser (T) [s]

Average power of the laser ($P_{avg}$) [W]—represents the energy flow over one period t Energy per pulse (Ep) [J]

Fluence of the laser (F) [J/cm$^2$]

Beam spot radius on the target (r) [m]

Beam spot area on the target (A=$\pi r^2$) [m$^2$]

Number of times surface of the target was scanned by the laser beam (N) dimensionless Speed at which surface of the target was scanned by the laser beam (V) [m/s]

Number of pulses fired per each spot on the surface of the target (n) [dimensionless]

Time interval between the pulses—one period (t) [s]

Peak Power ($P_{peak}$) [W]—defines the energy flow within a single pulse

Power density or Intensity (I) [W/cm$^2$]

Equations $$t = \frac{1}{\gamma}$$

$$n = \frac{(2r)\gamma}{V}$$

$$E_p = \frac{P_{avg}}{\gamma}$$

$$F = \frac{E_{pulse}}{A}$$

$$P_{peak} = \frac{E_{pulse}}{\tau}$$

$$I = \frac{P_{peak}}{A}$$

Suitable operating parameters can be selected, for example based on the equations and representations above, to obtain pulsed laser radiation of desired properties, for example a desired power density of the pulses.

Table 1 provides operating parameters of the laser to produce a desired periodic arrangement of structures on the surface, for an embodiment where the surface is copper. Three sets of operating parameters according to an embodiment are provided in table 1. The laser processing of the surface is performed in air in this case.

TABLE 1

| | | | | | | | | Fluence, J/cm² (Number |
| | | Focal Spot Diameter on the target, μm | Rep. Rate of the laser, kHz | | | Repetition Number of the scans | | of |
| Wavelength, nm | Pulse Width Range | | | Average Power, W | Scan Speed, mm/s | | Hatch Distance, μm | pulses per spot) |
|---|---|---|---|---|---|---|---|---|
| 532*** | ~10 ps | 12 | 200 | 0.94 (range between 0.77 to 1.00) | 10 | 1 | 24 | 4.16 (240) |
| 532** | ~10 ps | 40 | 200 | 0.75 | 10 | 1 | 30 | 0.3 (800) |
| 1064* | ~10 ps | 73 | 200 | 3.27 | 30 | 1 | 55 | 0.39 (487) |

*SEY data on the structuring is 1.8 and 1.6 for linear- and cross-hatched scans respectively; possible reason is REDUCED SURFACE TOPOGRAPHY compare to 532 nm processing, SEM images available.
**SEY data on the structuring is 1.13 (DL) and 1.3 (CERN). Processing parameters used for the first batch of CERN samples (Cu OFE and co-laminated Cu (layer thickness is ~80 μm) on Stainless Steel).

***REPORTED SEY data on the structuring: 0.75 (DL) and 0.95 (CERN).

In some other embodiments where the target is copper, operating parameters are selected as follows:

a) Wavelength of 532 nm; Pulse width of the laser: from 200 femtosecond to 200 picosecond; Focal spot diameter on the target: from 1 μm to 50 μm; Repetition rate of the laser from 10 kHz to 1 MHz; Average power from 0.3 W to 2 W; Scan speeds of 1 mm/s to 100 mm/s; Repetition number of scans from 1 to 10; Hatch Distance from 0.5 μm to 100 μm; angle of incidence of the laser beam from 0 to 30 degrees.

b) Wavelength of 1064 nm; Pulse width of the laser: from 200 femtosecond to 200 picosecond; Focal spot diameter on the target: from 1 to 50 μm; Repetition rate of the laser from 10 kHz to 1 MHz; Average power from 1 W to 5 W; Scan speeds of 1 mm/s to 100 mm/s; Repetition number of scans from 1 to 10; Hatch Distance from 0.5 μm to 100 μm; angle of incidence of the laser beam from 0 to 30 degrees.

Table 2 provides operating parameters of the laser to produce a desired periodic arrangement of structures on the surface, for an embodiment where the surface is aluminum.

In some other embodiments where the target is aluminum, operating parameters are selected as follows:

a) Wavelength of 1064 nm; Pulse width of the laser: from 200 femtosecond to 200 picosecond; Focal spot diameter on the target: from 1 μm to 50 μm; Repetition rate of the laser from 10 kHz to 1 MHz; Average power from 0.1 W to 1 W; Scan speeds of 1 mm/s to 100 mm/s; Repetition number of scans from 1 to 10; Hatch Distance from 0.5 μm to 100 μm; angle of incidence of the laser beam from 0 to 30 degrees.

Table 3 provides operating parameters of the laser to produce a desired periodic arrangement of structures on the surface, for an embodiment where the surface is stainless steel.

TABLE 2

| | | | | | | | | Fluence, J/cm² (Number |
| | | Focal Spot Diameter on the target, μm | Rep. Rate of the laser, kHz | | | Repetition Number of the scans | | of pulses |
| Wavelength, nm | Pulse Width Range | | | Average Power, W | Scan Speed, mm/s | | Hatch Distance, μm | per spot) |
|---|---|---|---|---|---|---|---|---|
| 1064 | ~10 ps | 12 | 200 | 0.21 | 10 | 1 | 20 | 0.93 (240) |

TABLE 3

Stainless steel

| Wavelength, nm | Pulse Width Range | Focal Spot Diameter on the target, μm | Rep. Rate of the laser, kHz | Average Power, W | Scan Speed, mm/s | Repetition Number of the scans | Hatch Distance, μm | Fluence, J/cm² (Number of pulses per spot) |
|---|---|---|---|---|---|---|---|---|
| 532 | ~10 ps | 12 | 200 | 0.44 | 10 | 1 | 24 | 1.95 (240) |

In some other embodiments where the target is stainless steel, operating parameters are selected as follows:
 a) Wavelength of 532 nm; Pulse width of the laser: from 200 femtosecond to 200 picosecond; Focal spot diameter on the target: from 1 μm to 50 μm; Repetition rate of the laser from 10 kHz to 1 MHz; Average power from 0.1 W to 2 W; Scan speeds of 1 mm/s to 100 mm/s; Repetition number of scans from 1 to 10; Hatch Distance from 0.5 μm to 100 μm.
 b) Wavelength of 1064 nm; Pulse width of the laser: from 200 femtosecond to 200 picosecond; Focal spot diameter on the target: from 1 μm to 50 μm; Repetition rate of the laser from 10 kHz to 1 MHz; Average power from 1 W to 5 W; Scan speeds of 1 mm/s to 100 mm/s; Repetition number of scans from 1 to 10; Hatch Distance from 0.5 μm to 100 μm; angle of incidence of the laser beam from 0 to 30 degrees.

Figure 2:
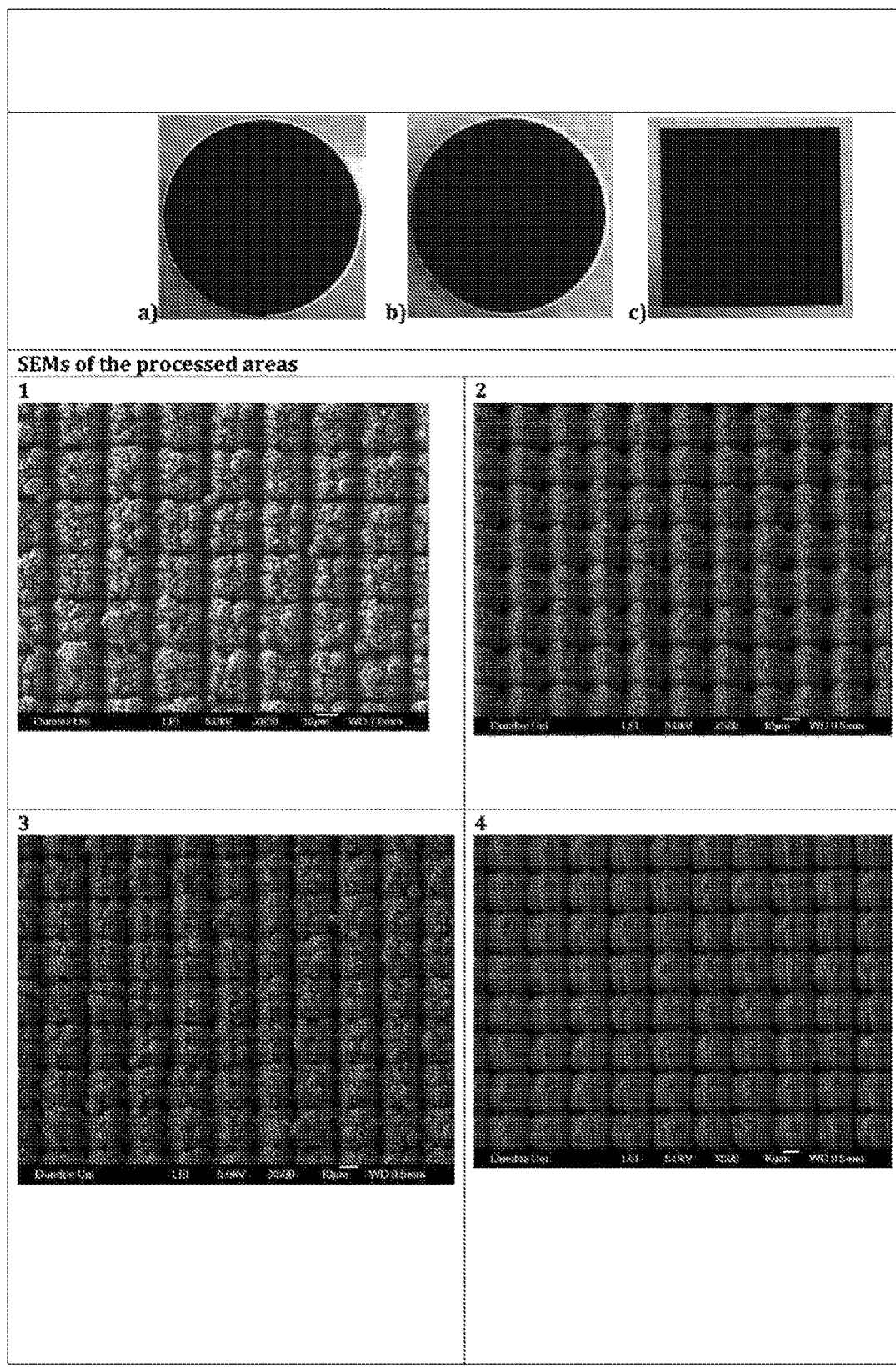
FIG. 2 shows images of copper samples following laser treatment to form periodic structures on the surfaces of the samples.

FIG. 2 shows images of copper samples following laser treatment to form periodic structures on the surfaces of the samples as described in relation to FIG. 1. The operating parameters used in the laser treatment of the copper samples are provided in the following table, Table 4. Three samples were treated, copper samples a), b) and c). Images of the samples a), b) and c), and four scanning electron microscope (SEM) images of the processed surfaces of samples, labelled 1 to 4, are shown in FIG. 2 and described in Table 4 below. SEY results for 13 mm copper samples are provided in Appendix 1 below.

Figure 3:
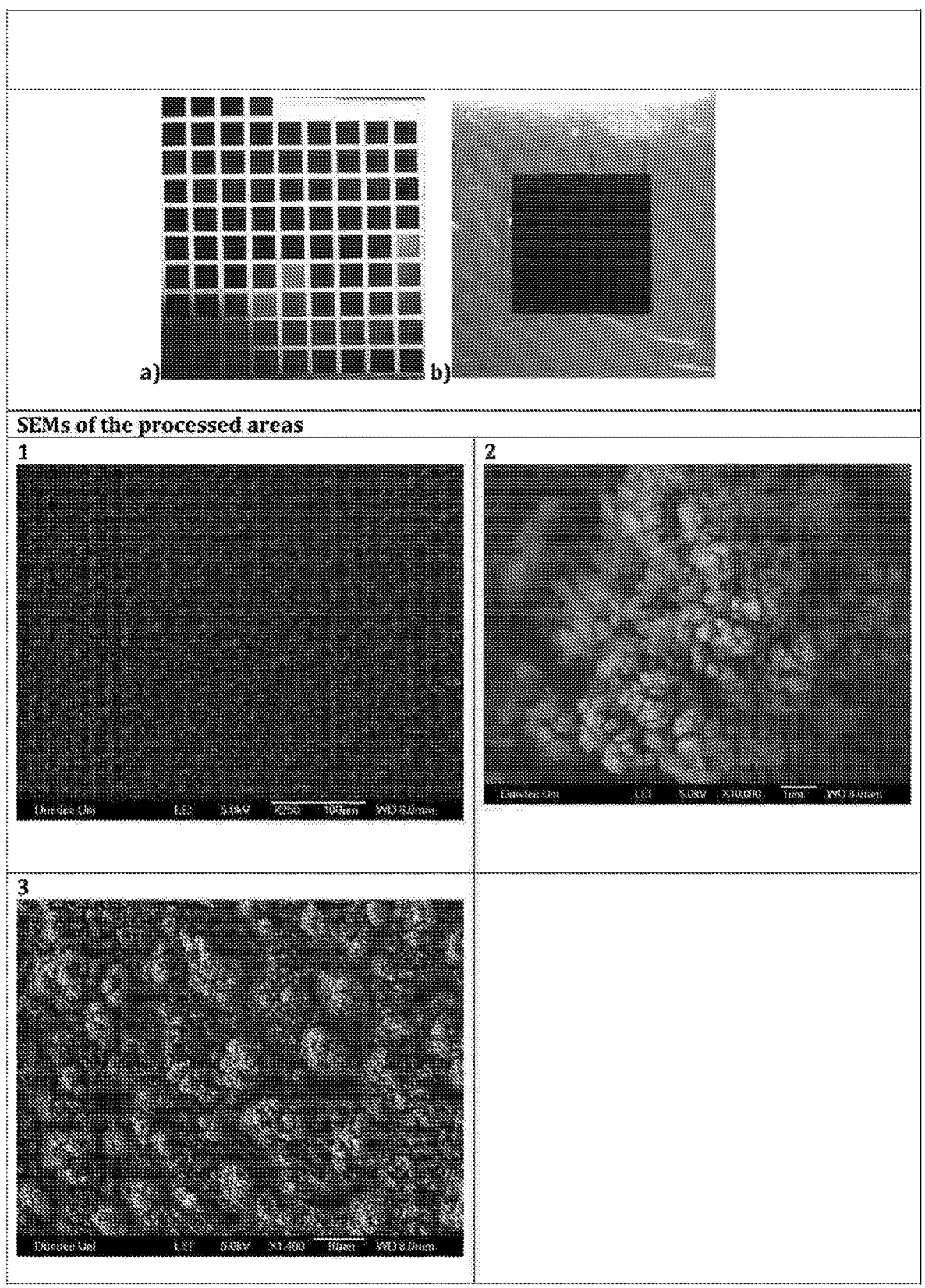
FIG. 3 shows images of aluminum samples following laser treatment to form periodic structures on the surfaces of the samples.

FIG. 3 shows images of aluminum samples following laser treatment to form periodic structures on the surface as described in relation to FIG. 1. The operating parameters used in the laser treatment of the aluminum samples are provided in the following table, Table 5. Two samples were treated, aluminum samples a) and b). Images of the samples a) and b) and three scanning electron microscope (SEM) images of the processed surface of a sample at different levels of magnification, labelled 1 to 3, are shown in the figure and described in Table 5 below.

TABLE 4

Samples:
a) Cu OFE disk, ø 29 mm, thickness 1 mm - processed area of about ø 28 mm.
b) Cu OFE disk, ø 13 mm, thickness 1 mm - processed area of about ø 12 mm.
c) Cu OFE substrate, 20 × 20 mm, thickness 1 mm - processed area of 15 × 15 mm.

a) b c)
SEMs of the processed areas

| 1 | 2 |
|---|---|
| Wavelength = 532 nm; Pulse length 10 ps; Focal spot diameter on the target = 12 micrometers; Rep. rate of the laser = 200 kHz; Average power = 0.81 W; Scan speed = 10 mm/s; Single scan over the surface; Hatch distance between the lines = 24 micrometers: Number of pulses fired per spot = 240 | Wavelength = 532 nm; Pulse length 10 ps; Focal spot diameter on the target = 12 micrometers; Rep. rate of the laser = 200 kHz; Average power = 0.95 W; Scan speed = 10 mm/s; Single scan over the surface; Hatch distance between the lines = 24 micrometers; Number of pulses fired per spot = 240 |
| 3 | 4 |
| Wavelength = 532 nm; Pulse length 10 ps; Focal spot diameter on the target = 12 micrometers; Rep. rate of the laser = 200 kHz; Average power = 0.77 W; Scan speed = 10 mm/s; Single scan over the surface; Hatch distance between the lines = 24 micrometers; Number of pulses fired per spot = 240 | Wavelength = 532 nm; Pulse length 10 ps; Focal spot diameter on the target = 12 micrometers; Rep. rate of the laser = 200 kHz; Average power = 0.90 W; Scan speed = 10 mm/s; Single scan over the surface; Hatch distance between the lines = 24 micrometers; Number of pulses fired per spot = 240 |
| 5, 6, 7, 8, 9 and 10 are all the similar parameters but only with different average powers within the range given in the parameters data. | 6 |
| 7 | 8 |
| 9 | 10 |

TABLE 5

Samples:
a) Aluminium, 25 × 25 mm, thickness 1 mm - processed area of about 20 × 20 mm.
b) Aluminium, thickness 1 mm - processed area of about 5 × 5 mm.

a) b)
SEMs of the processed areas

| | |
|---|---|
| 1 | 2 |
| Wavelength = 1064 nm; Pulse length 10 ps; Focal spot diameter on the target = 12 micrometers; Rep. rate of the laser = 200 kHz; Average power = 0.21 W; Scan speed = 10 mm/s; Single scan over the surface; Hatch distance between the lines = 20 micrometers; Number of pulses fired per spot = 240 | The same parameters as in image 1. It is a higher magnification (10000) of the image presented in 1. |
| 3 | |
| The same as one. It is a higher magnification (1400) of the image presented in 1. The parameters are the same. | |

Figure 4A:
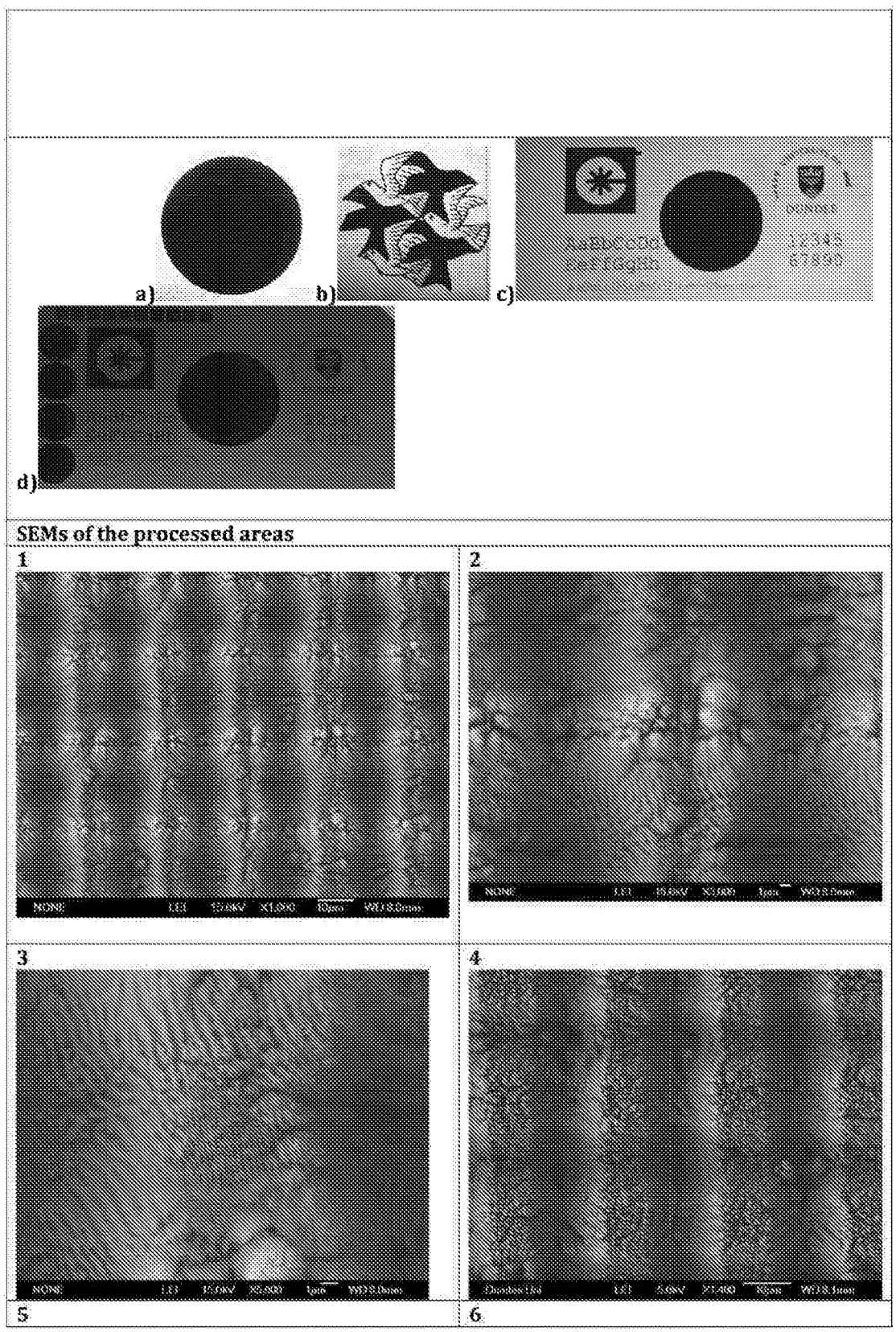
FIGS. 4a and 4b show images of aluminum samples following laser treatment to form periodic structures on the surfaces of the samples.
Figure 4B:
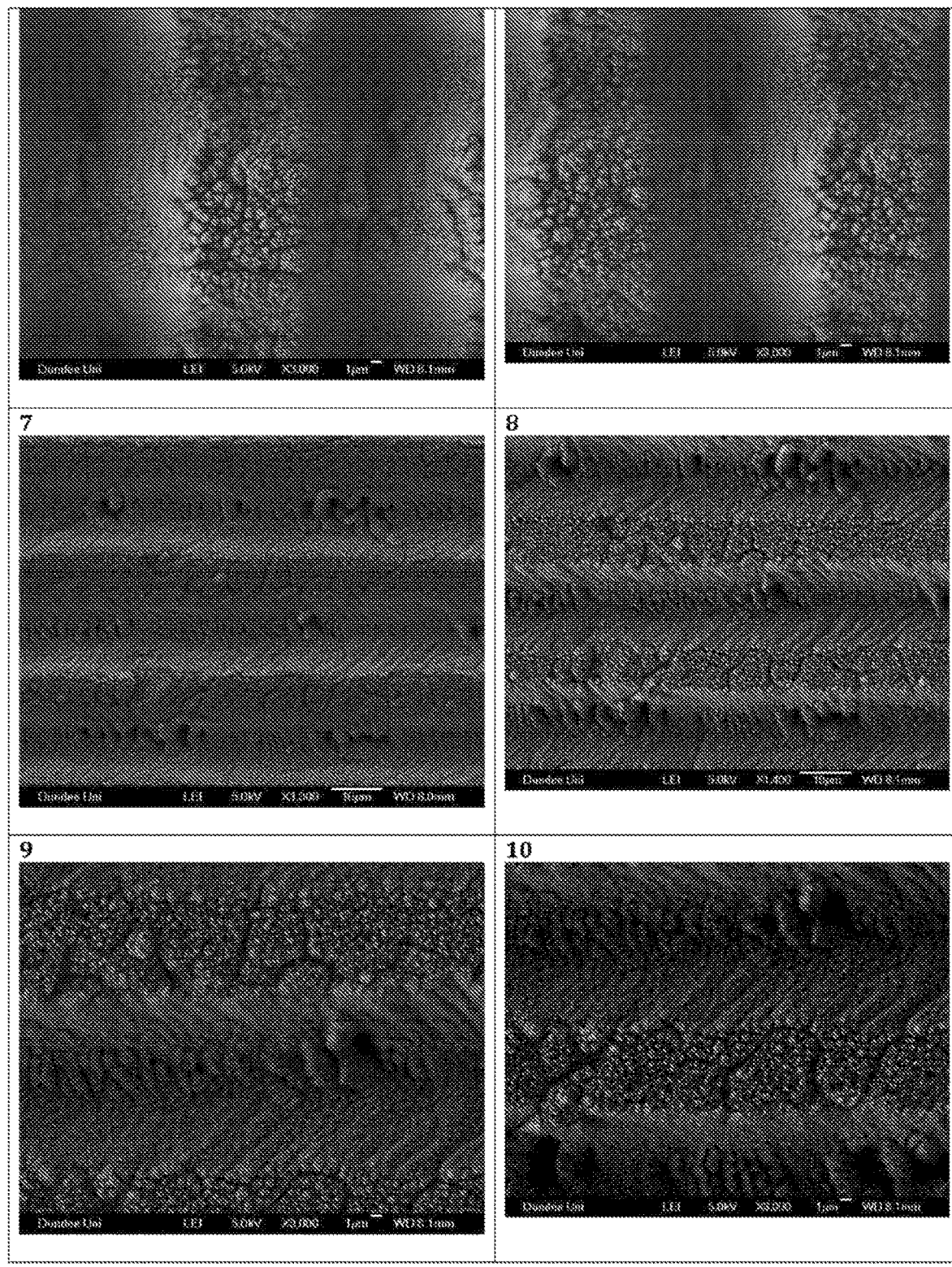

FIGS. 4a and 4b shows images of stainless steel samples following laser treatment to form periodic structures on the surface as described in relation to FIG. 1. The operating parameters used in the laser treatment of the samples are provided in the following tables, Tables 6a and 6b. Four samples were treated, stainless steel samples a), b), c) and d). Images of the samples a), b), c) and d) and scanning electron microscope (SEM) images of the processed surfaces of the samples, labelled 1 to 10, are shown in FIGS. 4a and 4b and described in Tables 6a and 6b below.

TABLE 6a

Samples:
a) Stainless Steel, 20 × 20 mm, thickness 200 μm - processed area of about ø 18 mm.
b) Stainless Steel, thickness 1 mm - processed area of about 20 × 20 mm.
c&d) Stainless Steel (not polished(c), polished (d)), thickness 1 mm, various processed areas.

a) b) c) d)
SEMs of the processed areas

| | |
|---|---|
| 1 | 2 |
| Wavelength = 532 nm; Pulse length 10 ps; Focal spot diameter on the target = 12 micrometers; Rep. rate of the laser = 200 kHz; Average power = 0.44 W; Scan speed = 10 mm/s; Single scan over the surface; Hatch distance between the lines = 24 micrometers; Number of pulses fired per spot = 240 | The same parameters as in image 1. It is a higher magnification (3000) of the image presented in 1. |
| 3 | 4 |
| The same parameters as in image 1. It is a higher magnification (5000) of the image presented in 1. | Wavelength = 1064 nm; Pulse length 20 ps; Focal spot diameter on the target = 15 micrometers; Rep. rate of the laser = 200 kHz; Average power = 0.8 W; Scan speed = 10 mm/s; Single scan over the surface; Hatch distance between the lines = 24 micrometers; Number of pulses fired per spot = 300 |
| 5 | 6 |
| The same parameters as in image 4. It is a higher magnification (3000) of the image presented in 1. | The same parameters as in image 4. It is a higher magnification (3000) of the image presented in 1. |
| 7 | 8 |
| Example of linear scan. Wavelength = 532 nm; Pulse length 10 ps; Focal spot diameter on the target = 12 micrometers; Rep. rate of the laser = 200 kHz; Average power = 0.44 W; Scan speed = 10 mm/s; Single scan over the surface; Hatch distance between the lines = 24 micrometers; Number of pulses fired per spot = 240 | Example of linear scan. Wavelength = 1064 nm; Pulse length 20 ps; Focal spot diameter on the target = 15 micrometers; Rep. rate of the laser = 200 kHz; Average power = 0.8 W; Scan speed = 10 mm/s; Single scan over the surface; Hatch distance between the lines = 24 micrometers; Number of pulses fired per spot = 300 |

TABLE 6b

| | |
|---|---|
| 9 | 10 |
| The same parameters as in image 8. It is a higher magnification (3000) of the image presented in 1. | The same parameters as in image 8. It is a higher magnification (3000) of the image presented in 1. |

Appendix 2 provides further operating parameters of the laser to produce a desired periodic arrangement of structures on the surface according to further embodiments.

Figure 5:
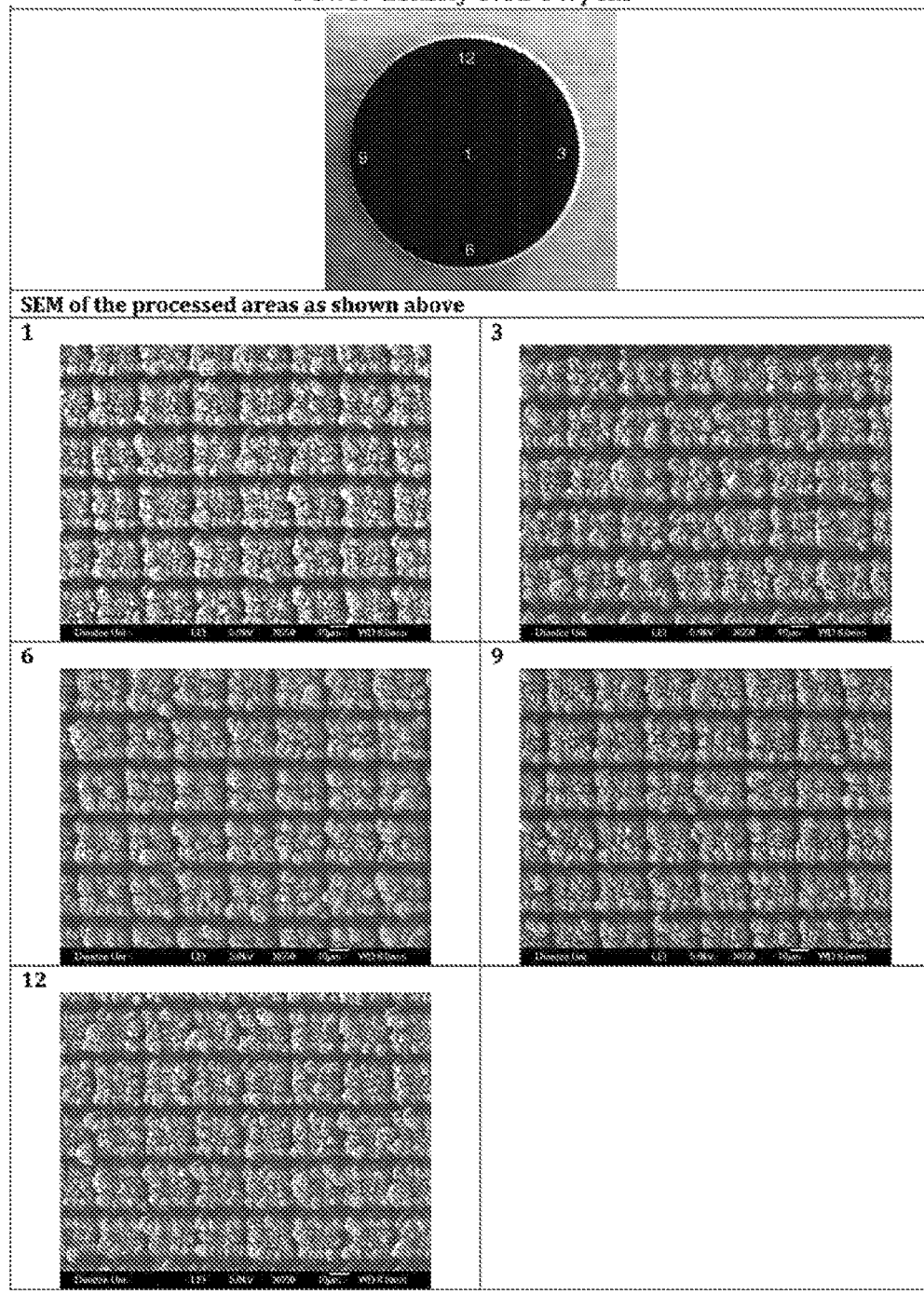
FIGS. 5 to 24 show images of further samples and/or plots of properties of further samples, following laser treatment to form periodic structures on the surfaces of the further samples.

FIG. 5 shows an image of a copper sample following laser treatment to form periodic structures (in this case cross-hatched structures) on the surface of the sample as described. Five SEM images at five points (labelled 1, 3, 6, 9, 12) on the surface are also included in FIG. 5 and show top-hat pyramid structures.

Figure 6:
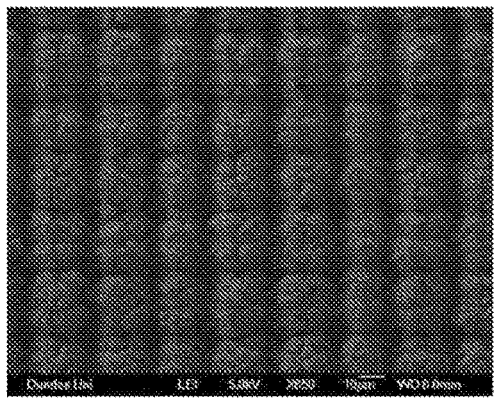
Figure 6:
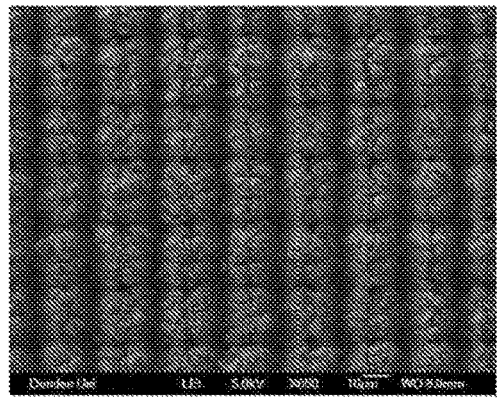
Figure 6:
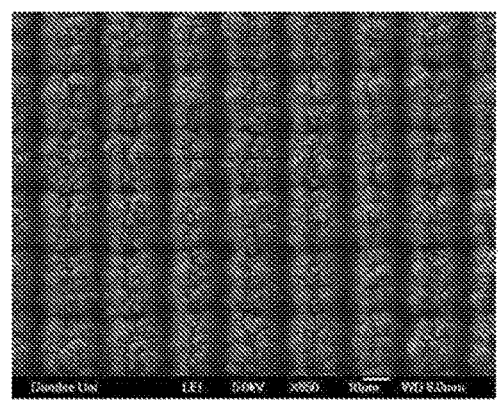
Figure 6:
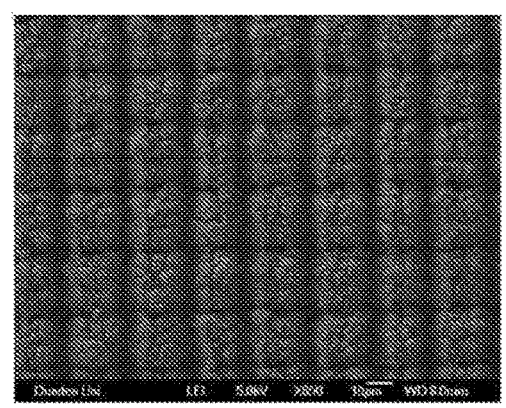
Figure 6:
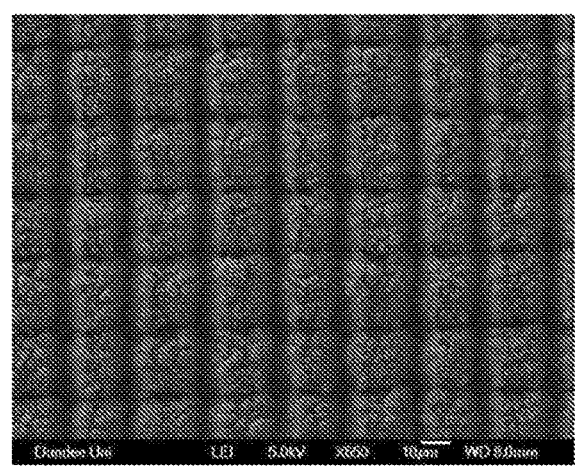

FIG. 6 shows SEM images of further surfaces, labelled (a) to (e), following laser treatment to form periodic structures (in this case cross-hatched structures) on the surface of the sample as described. Each different sample was subject to pulses of a respective different power density as indicated in FIG. 6.

Figure 7:
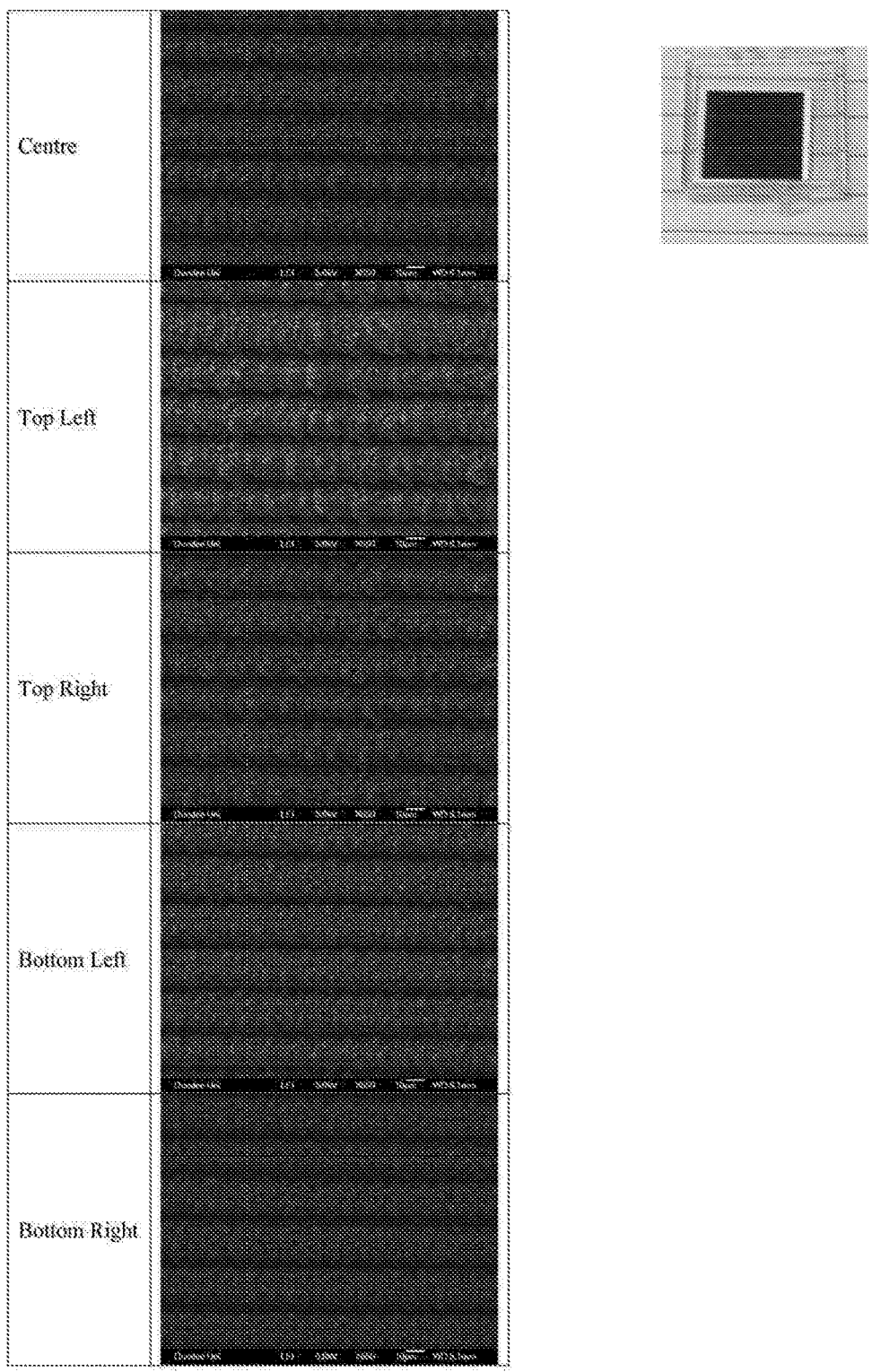

FIG. 7 shows an image of a sample following laser treatment to form periodic structures (in this case parallel lines) on the surface of the sample. Five SEM images at five regions of the sample surface are also shown. The sample was subject to laser pulses of power density equal to 0.4 TW/cm$^2$.

Figure 8:
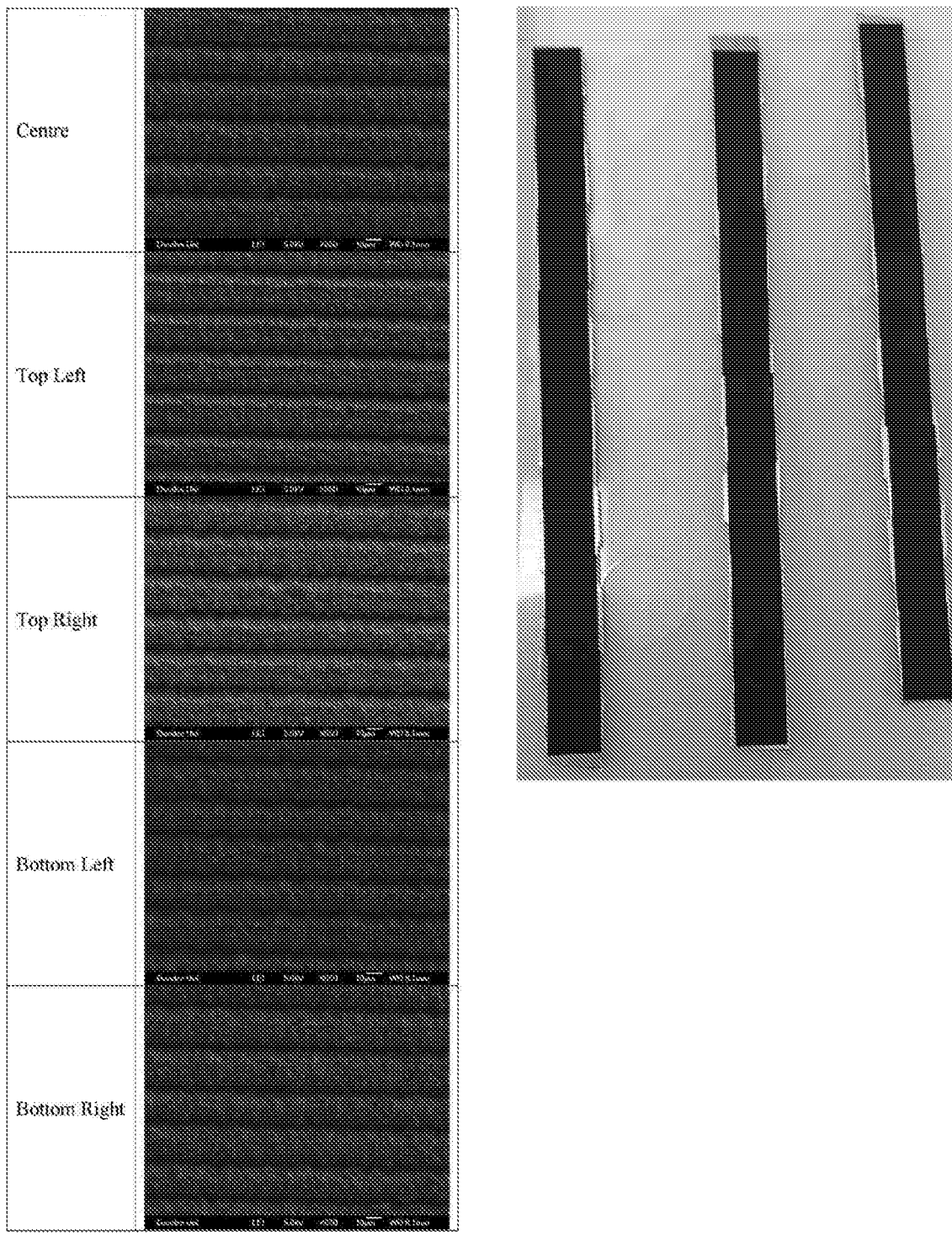

FIG. 8 shows images of three samples following laser treatment to form periodic structures (in this case parallel lines) on the surface of the samples as described. Five SEM images at five regions of the surface of one of the samples are also shown. The sample was subject to laser pulses of power density equal to 0.2 TW/cm².

Figure 9:
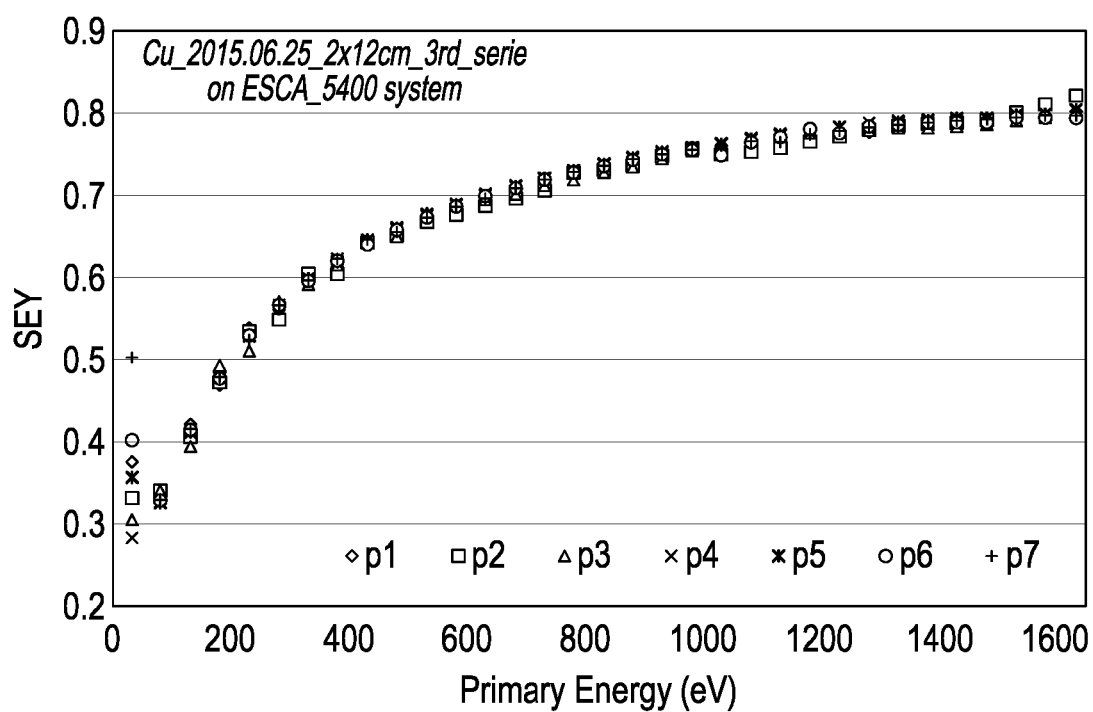

FIG. 9 is a plot of SEY against primary electron energy measured for a sample following laser treatment to form periodic structures on the surface of the sample as described.

Figure 10:
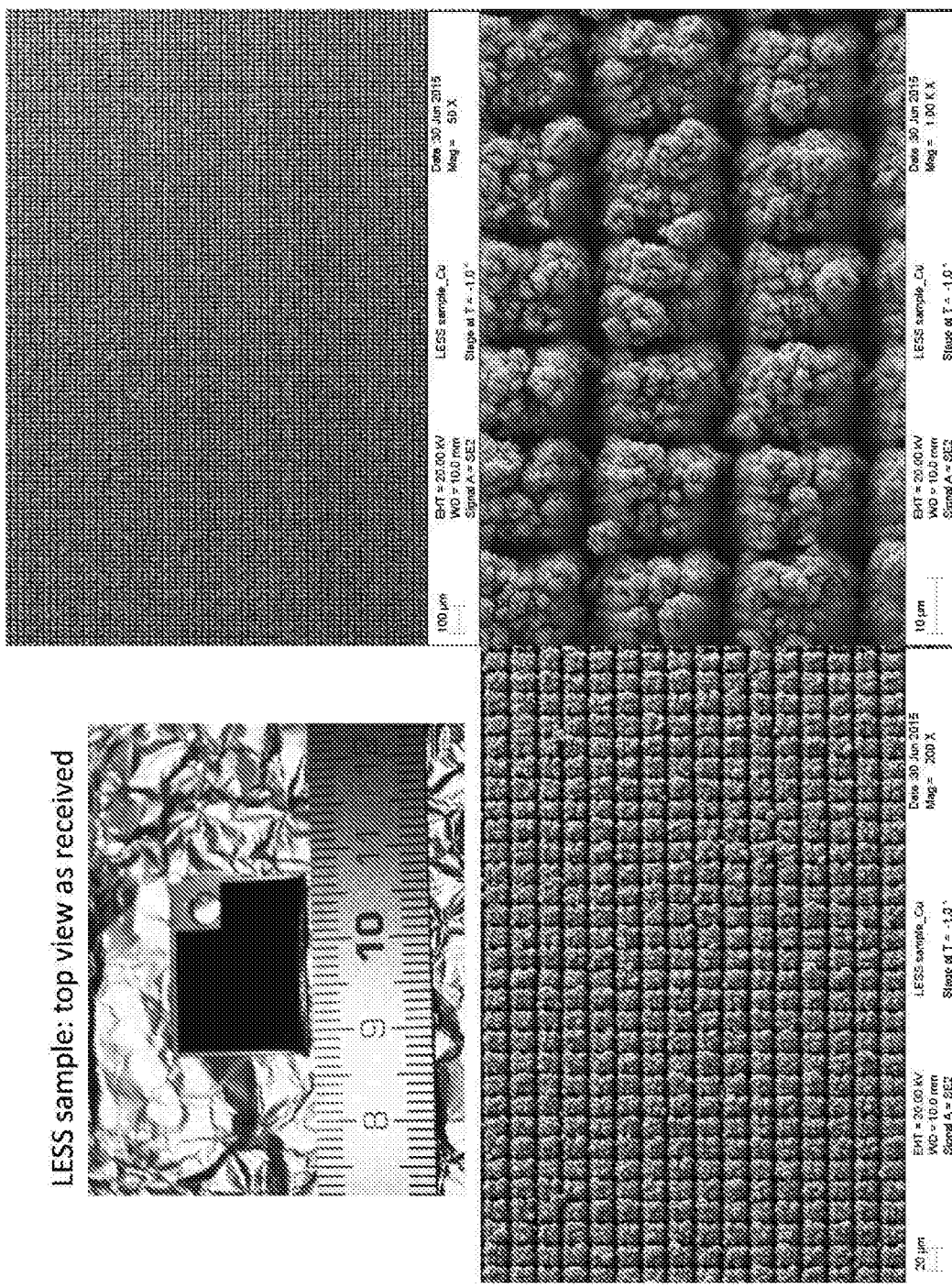

FIG. 10 shows an image of a copper sample, following laser treatment to form periodic structures on the surface as described. FIG. 10 also shows SEM images of regions of the surface at different magnifications.

Figure 11:
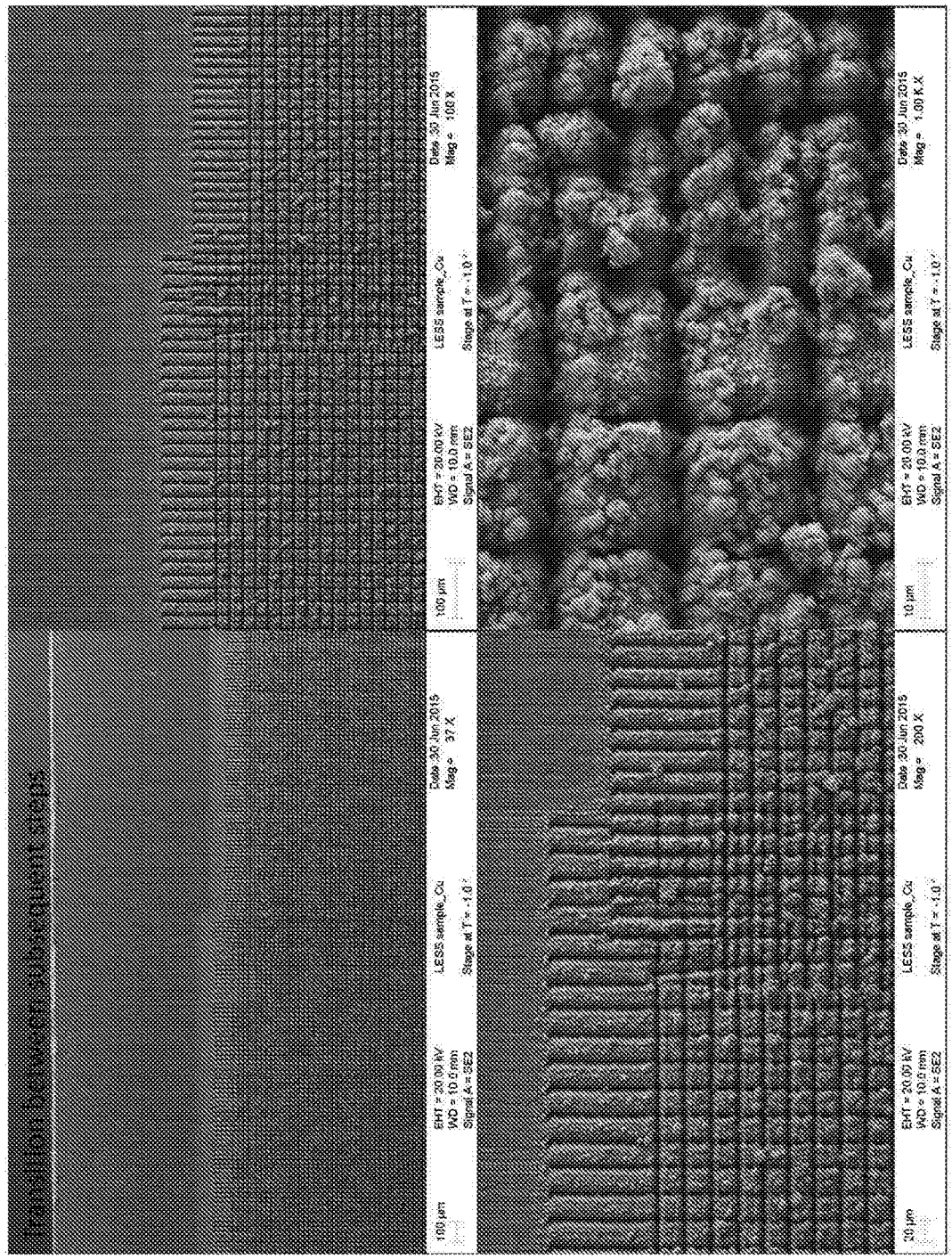

FIG. 11 shows SEM images, at various magnifications, of different regions of the surface of a copper sample, following laser treatment to form periodic structures on the surface as described.

Figure 12:
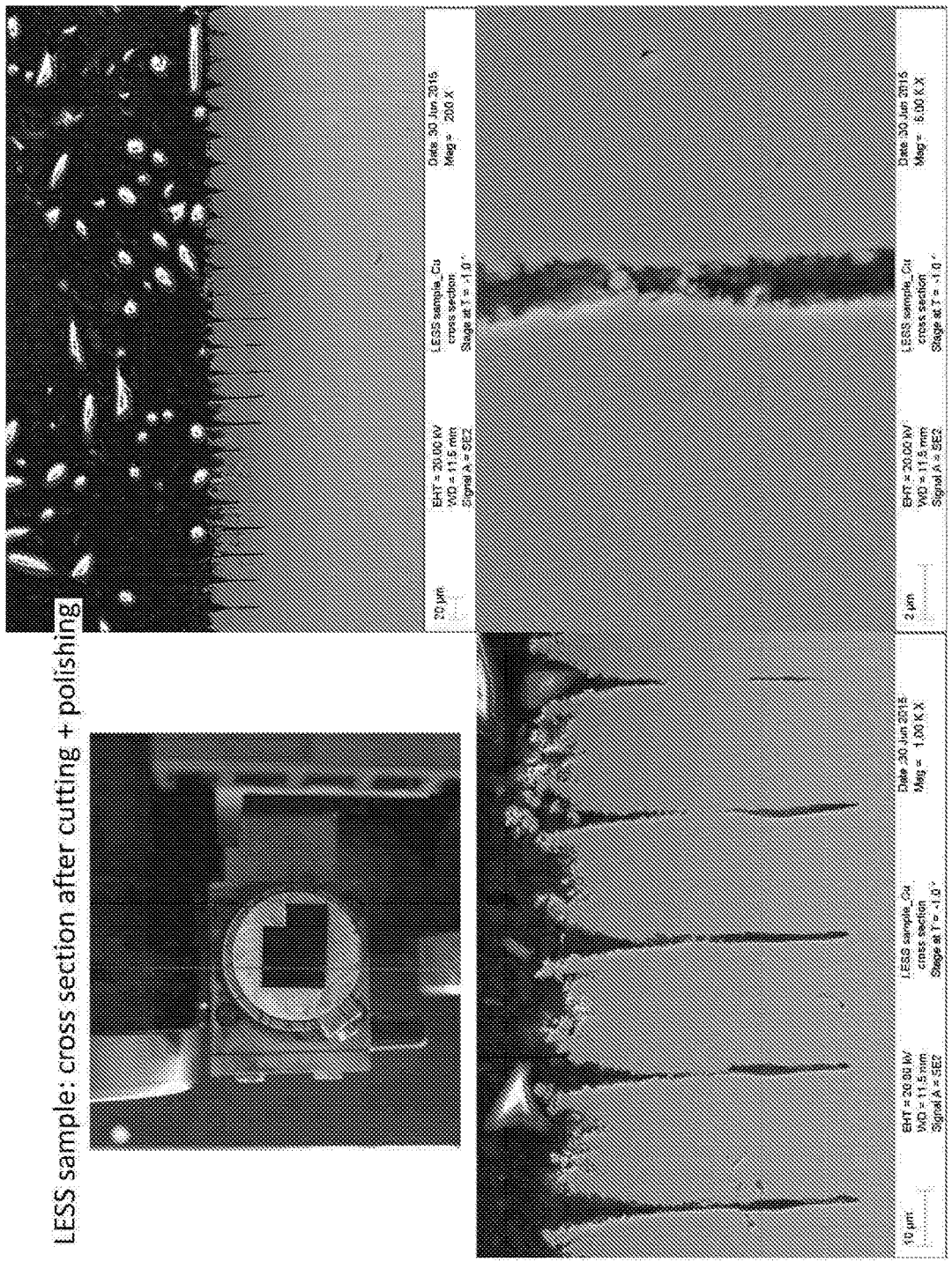

FIG. 12 shows SEM images at various magnifications of a cross-section of a copper sample following laser treatment to form periodic structures on the surface as described, and following cutting and polishing, together with a further image of the sample in face-on view.

Figure 13:
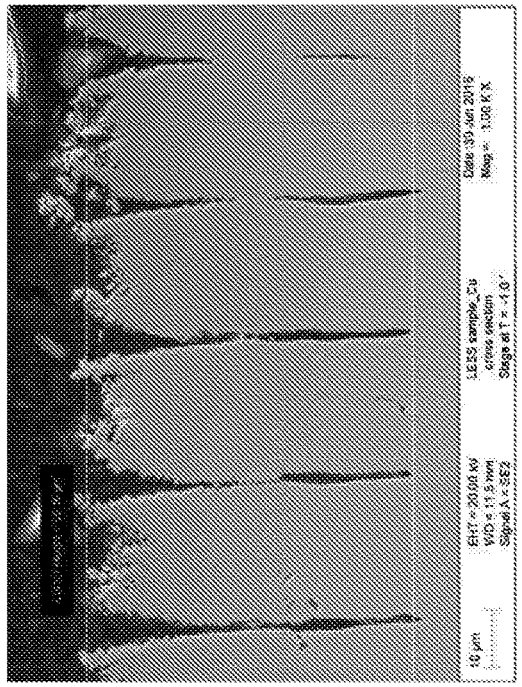
Figure 13:
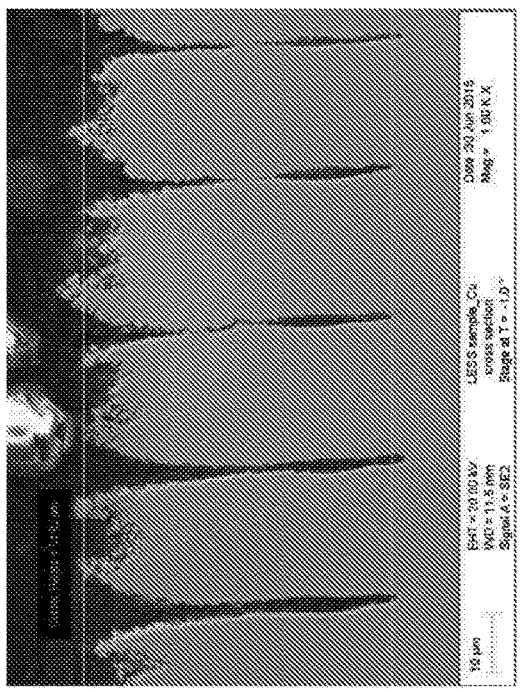
Figure 13:
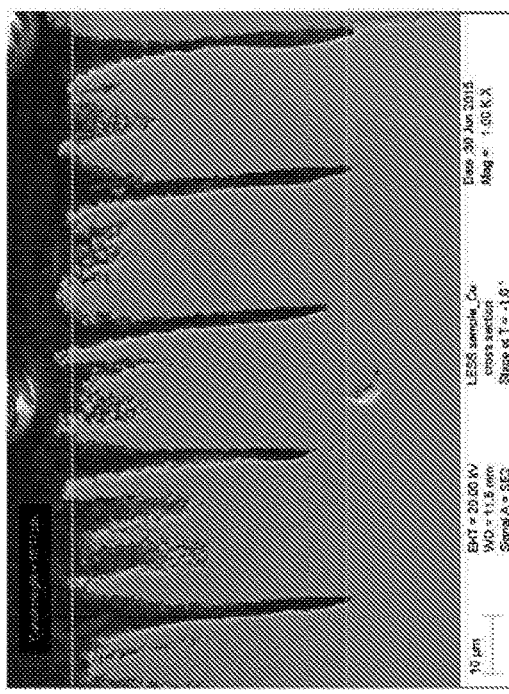
Figure 14:
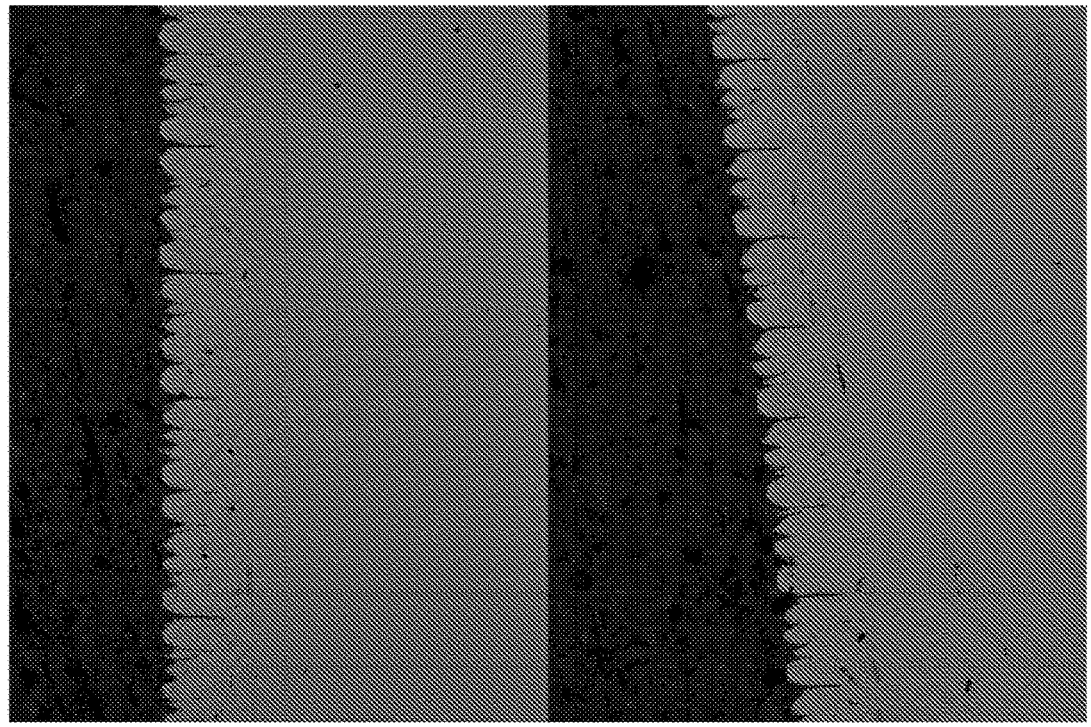
Figure 14:
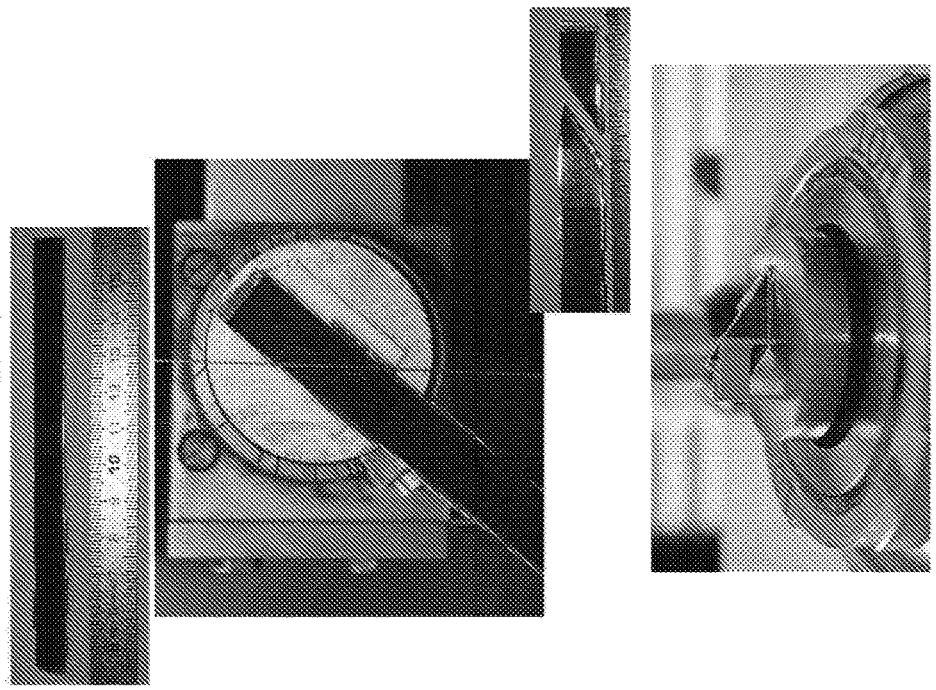

FIG. 13 shows SEM images of a cross-section of a copper sample at different regions of the sample, following laser treatment to form periodic structures on the surface, FIG. 14 shows images of a co-laminated sample comprising a copper layer on a stainless steel layer, following laser treatment to form periodic structures on the surface as described, and SEM images of cross-sections of the sample.

Figure 15:
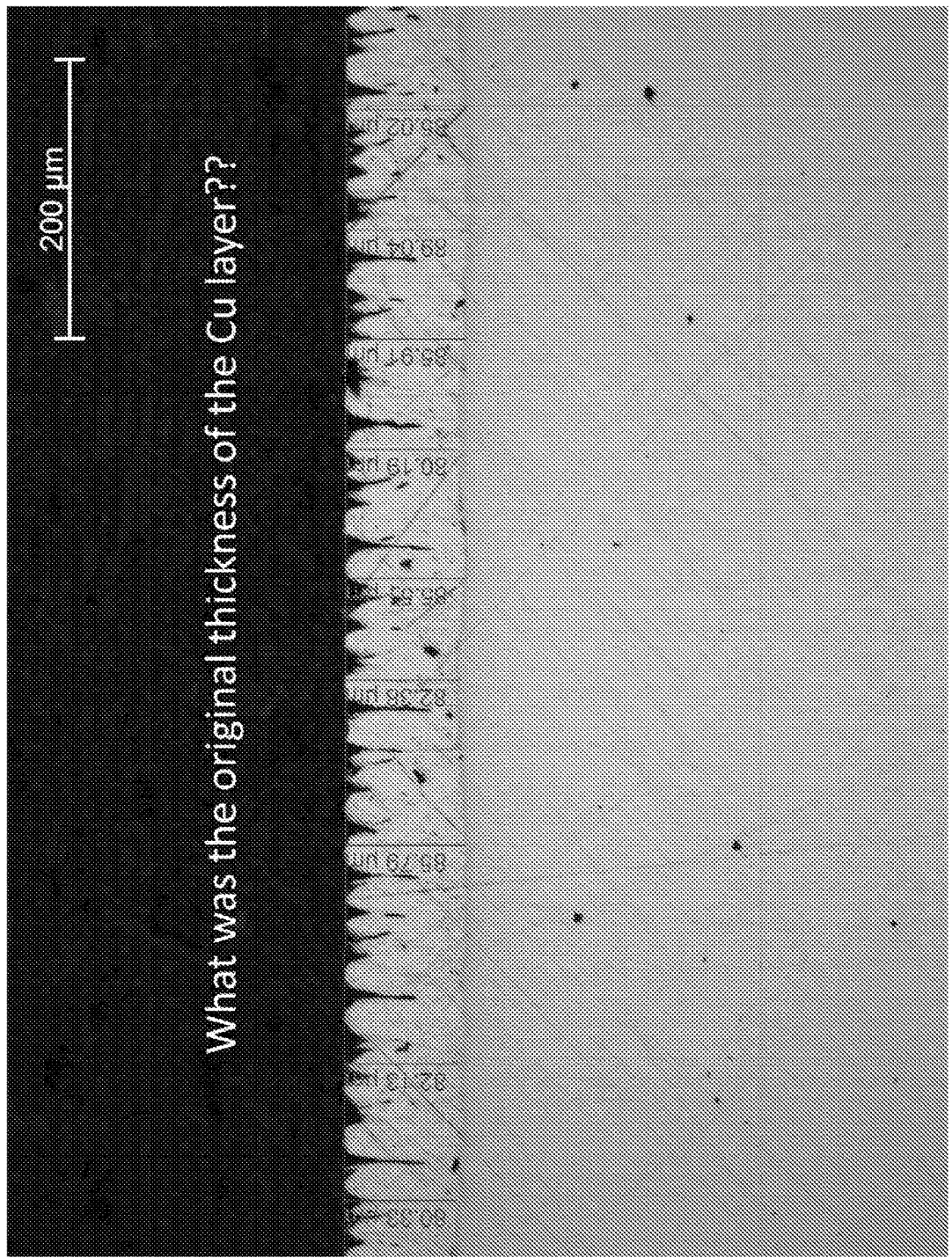

FIG. 15 shows a further SEM image of a cross-section of a sample, following laser treatment to form periodic structures on the surface as described.

Figure 16:
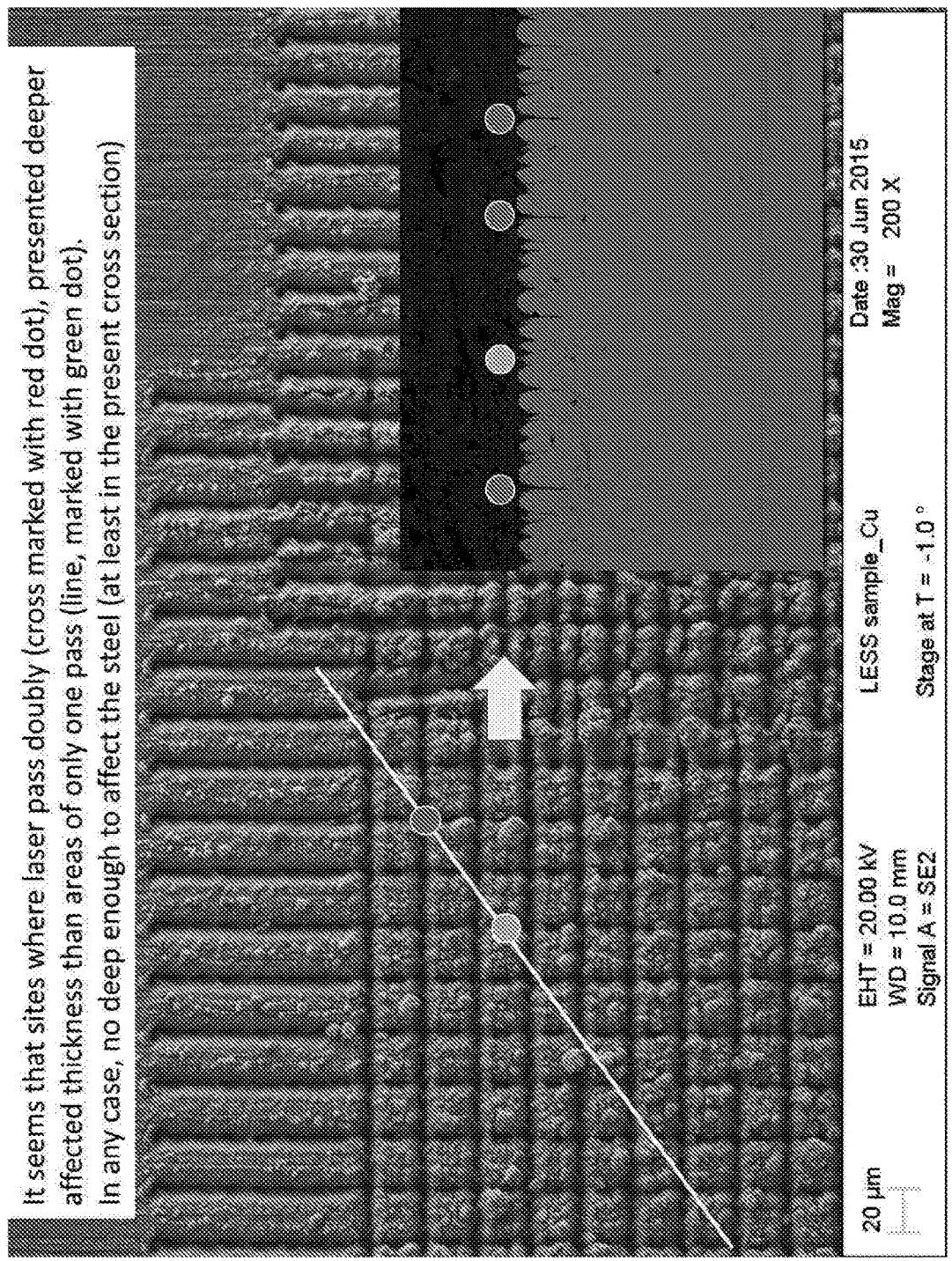

FIG. 16 shows an SEM image of a sample in face-on view, following laser treatment to form periodic structures on the surface as described. An inset image is included in the figure, and is an SEM cross-sectional image of a cross-section running along a line indicated in the face-on image. Corresponding positions on the face-on image and the cross-sectional image are marked with dots. There are three red dots (showing darker in black and white version of the figure) and one green dot (showing lighter in black and white version of the figure). The red dots indicate regions where the laser passed twice and the green dot indicates a region where the laser passed once. It can be seen in the cross-sectional image that two passes of the laser produced deeper valleys/troughs than one pass of the laser.

Figure 17:
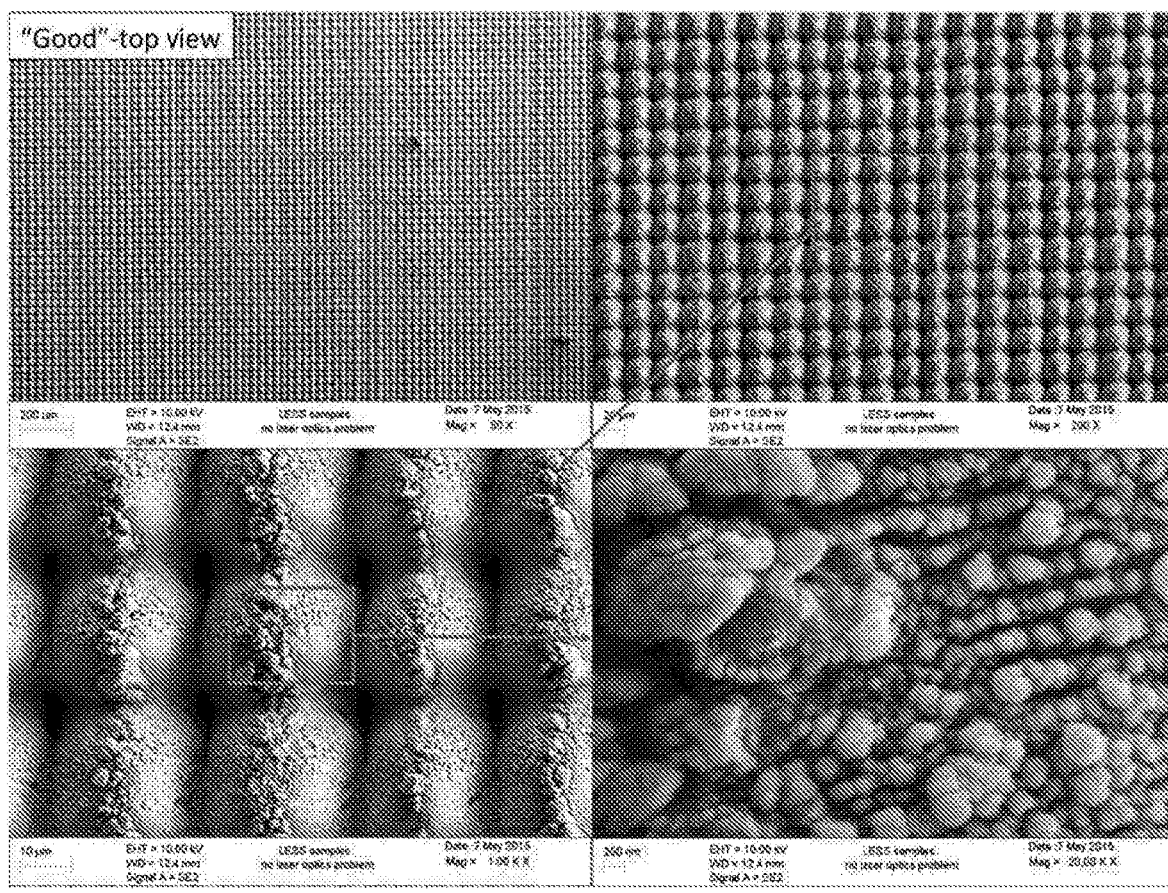

FIG. 17 shows SEM images of a surface of a copper sample following laser treatment to form periodic structures on the surface as described. The laser treatment used laser pulses of wavelength 532 nm and laser pulse power density of 29.6 GW/cm².

Figure 18:
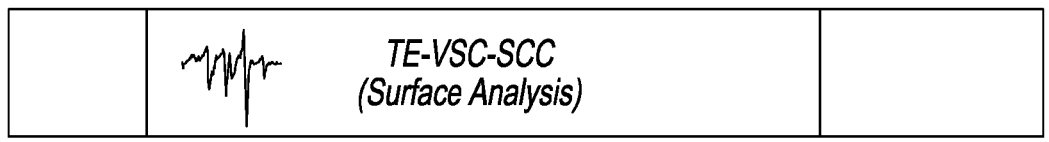
Figure 18:
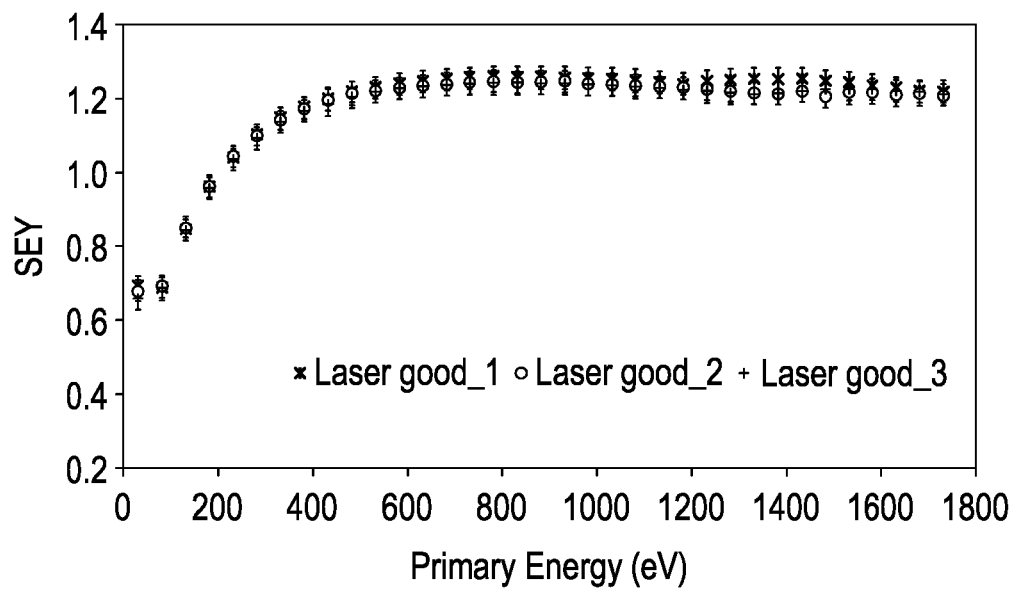

FIG. 18 is a plot of SY versus primary electron energy for measurements performed at three randomly selected points on the surface of the copper sample of FIG. 17.

Figure 19:
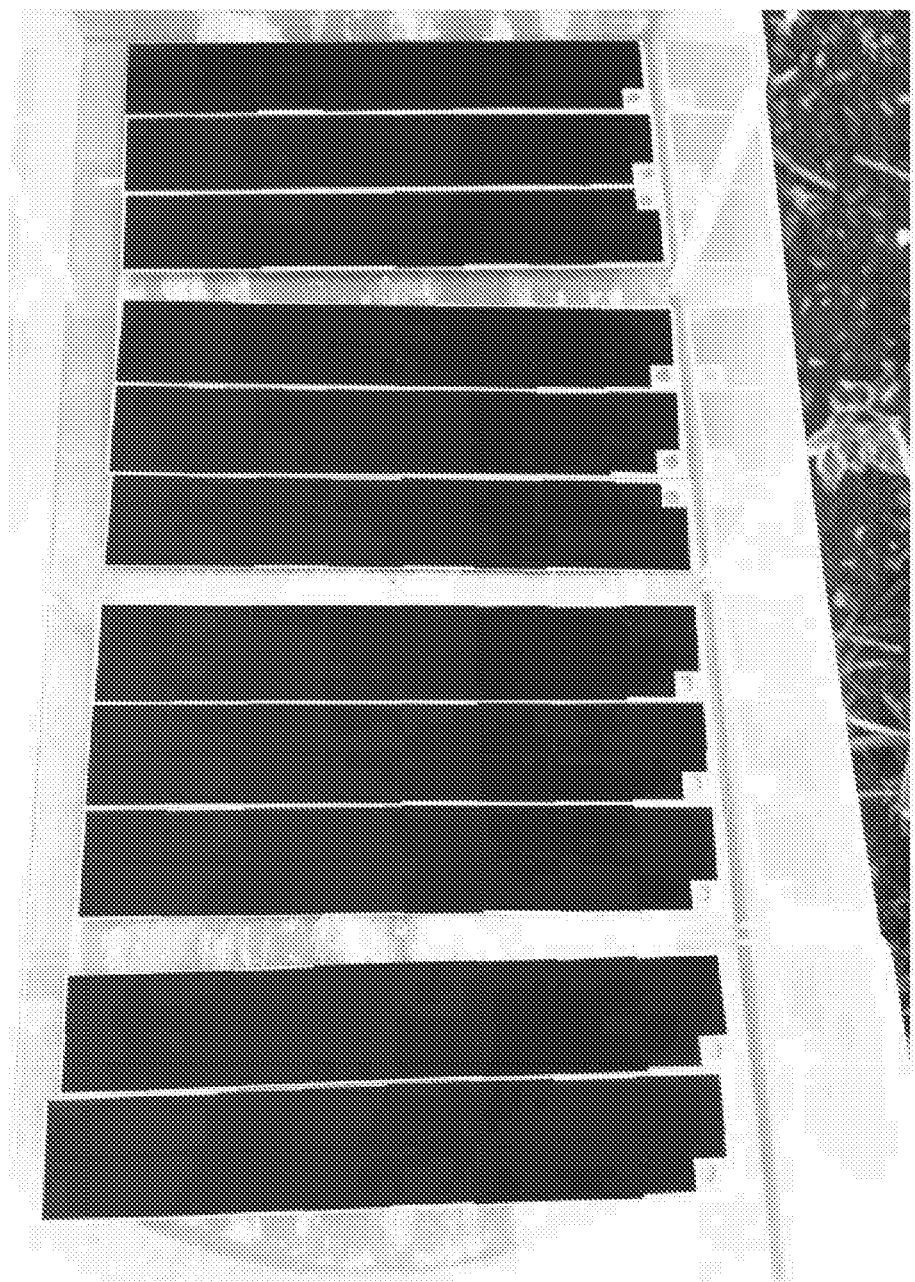

FIG. 19 is an image of sample surfaces, including for the copper sample of FIGS. 17 and 18.

Figure 20:
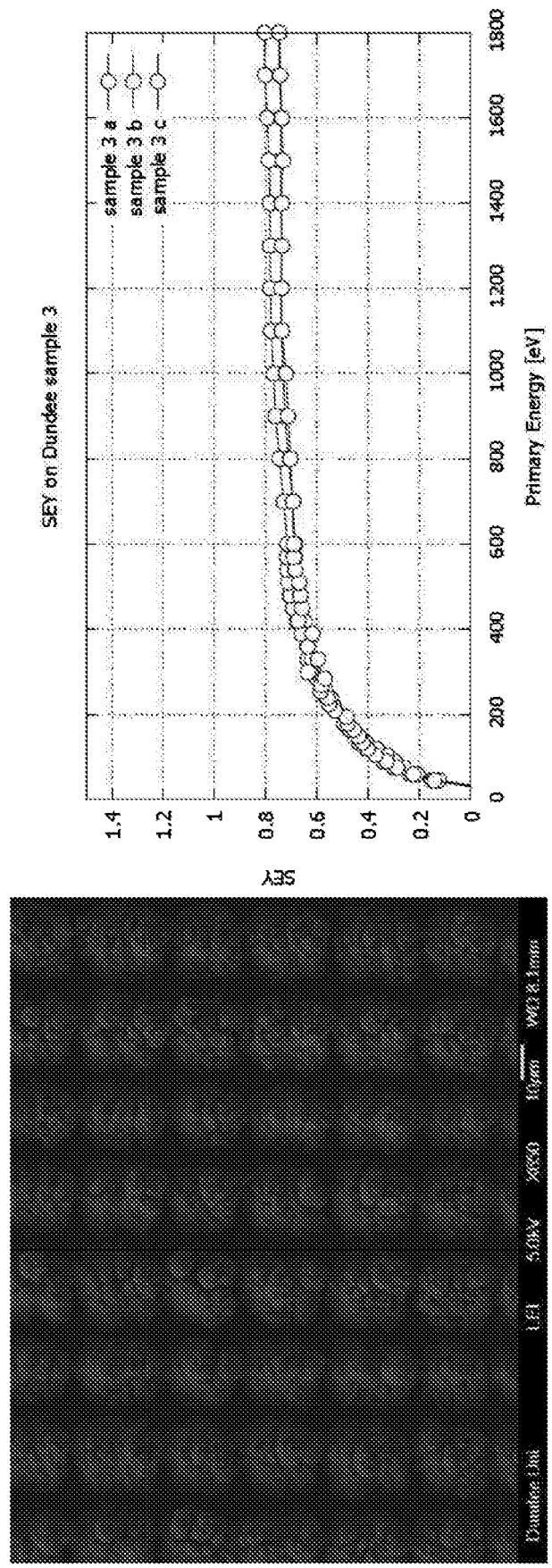

FIG. 20 shows an image of a surface of a sample following laser treatment to form periodic structures (in this case cross-hatching) on the surface as described, together with a plot of SEY versus primary energy for three cross-hatched samples following laser treatment to form periodic structures on the surface as described.

Figure 21:
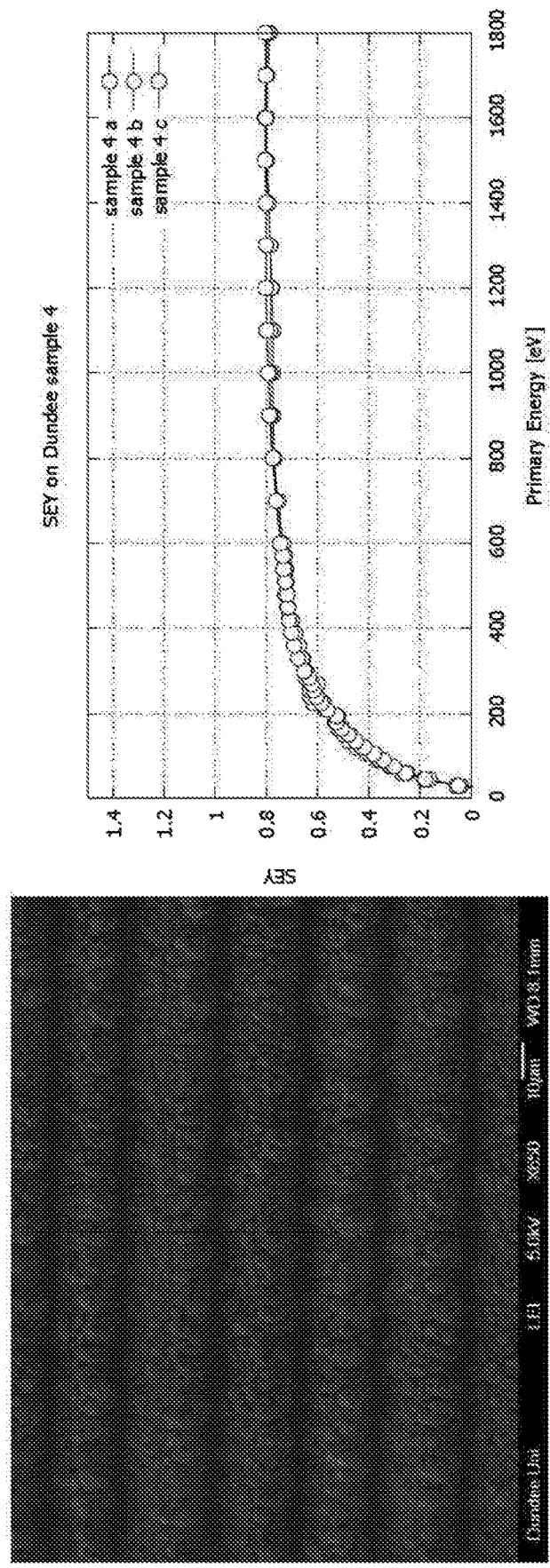

FIG. 21 shows an image of a surface of a sample following laser treatment to form periodic structures (in this case grooves) on the surface as described, together with a plot of SEY versus primary energy for three grooved samples following laser treatment to form periodic structures on the surface as described.

Figure 22:
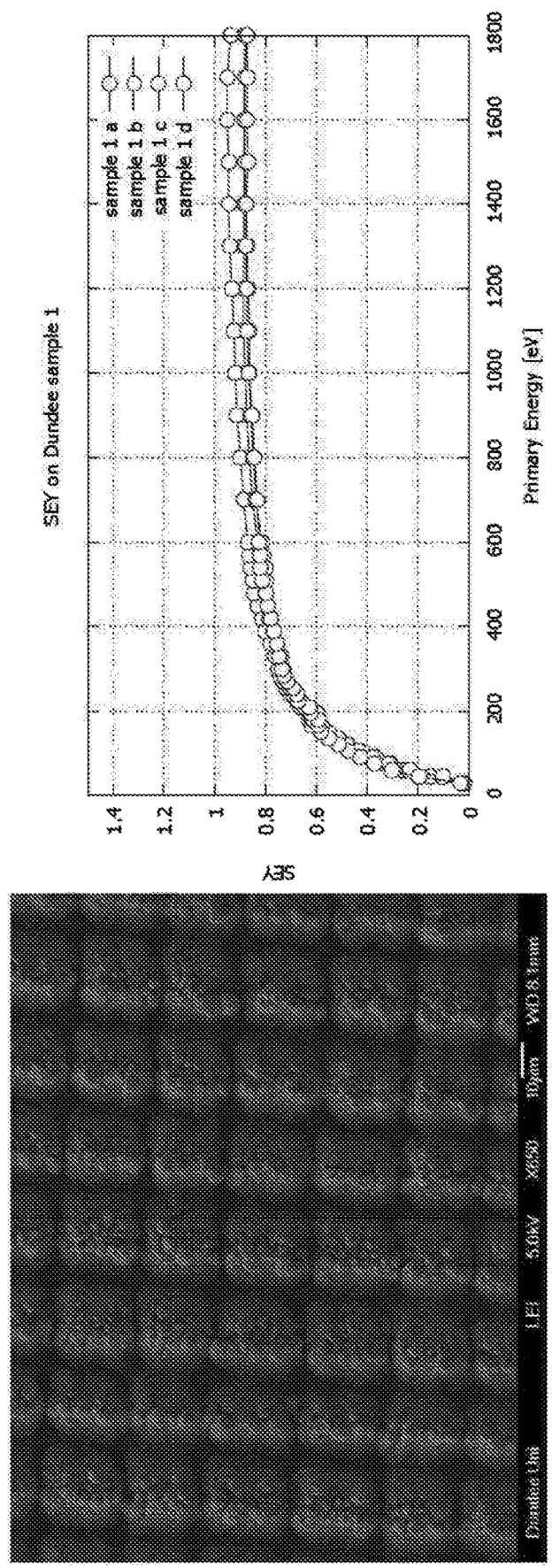

FIG. 22 shows an image of a surface of a sample following laser treatment to form periodic structures (in this case cross-hatching) on the surface as described, together with a plot of SEY versus primary energy for four cross-hatched samples following laser treatment to form periodic structures on the surface as described.

Figure 23:
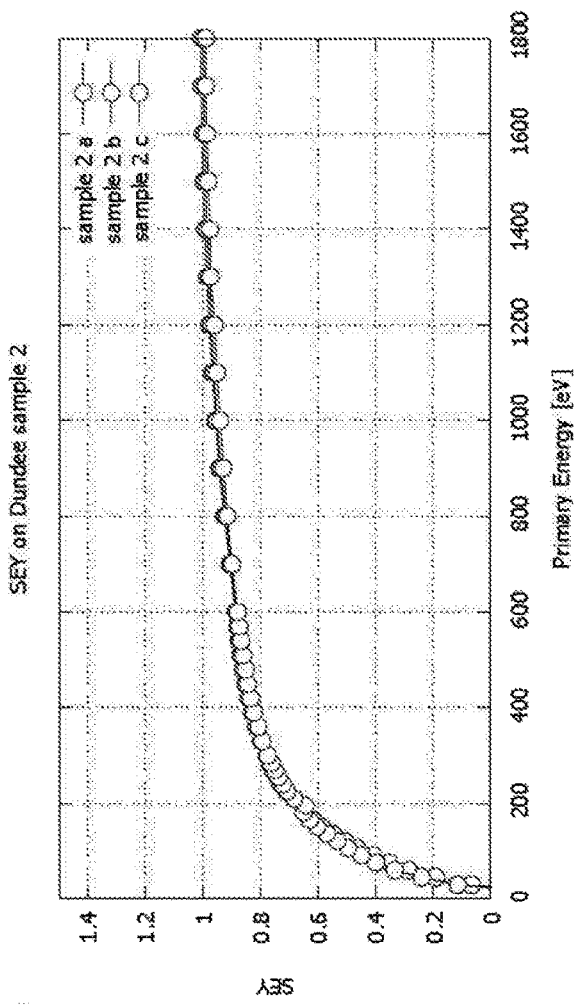
Figure 23:
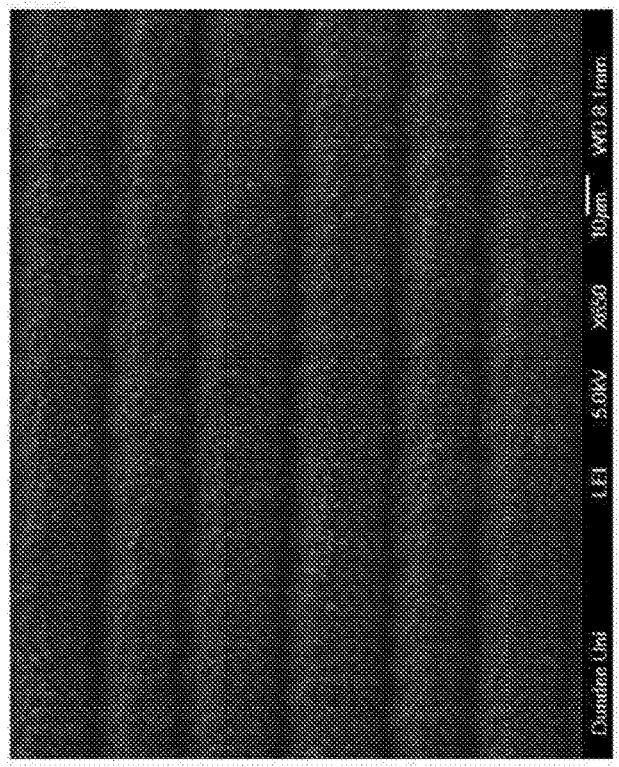

FIG. 23 shows an image of a surface of a sample following laser treatment to form periodic structures (in this case grooves) on the surface as described, together with a plot of SEY versus primary energy for three grooved samples following laser treatment to form periodic structures on the surface as described.

Figure 24:
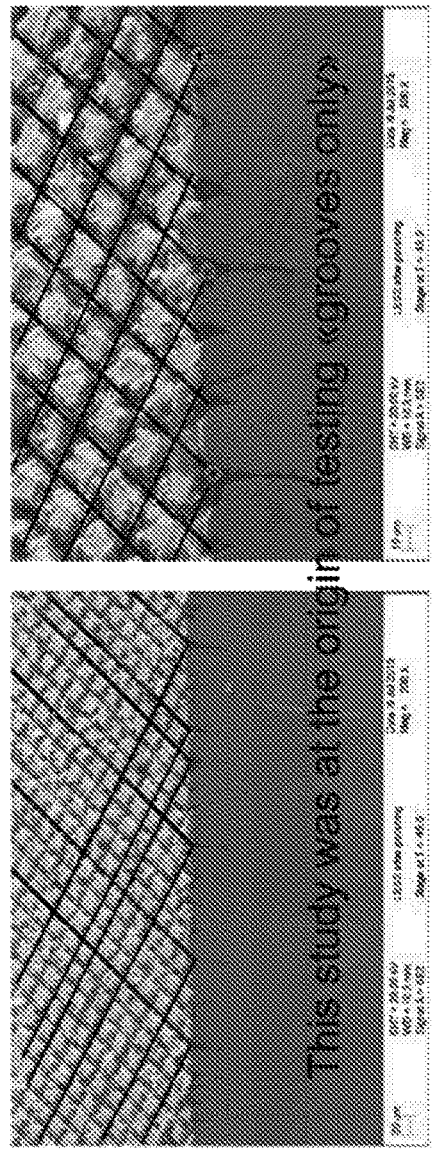

FIG. 24 shows further images of surfaces of samples following laser treatment to form periodic structures on the surface of the samples as described.

Without wishing to be bound by theory, and without limitation to the scope of protection, the following comments are provided which relate to processes which may occur in relation to at least some embodiments.

Laser engineering provides an overarching methodology that provides for the formation of periodic structures according to embodiments. Precision laser engineering is expected to excite free electrons within metals, vibrations within insulators, and indeed both types of excitations within semiconductors. The mechanisms by which lasers can engineer materials include the following:
  (i) Photo-thermal interaction (PTI)—commonly achieved using laser beams providing short dwell time (e.g. lasers with nanosecond pulsewidth);
  (ii) Photo-ablation interaction (PAI)—envisaged using laser beams providing ultra-short dwell time (e.g. lasers with picosecond or femtosecond pulsewidth).

The laser processing in respect of the embodiments described in relation to Tables 4 and 5 and FIGS. 13 to 16 may be in the PTI regime. The laser processing in respect of the embodiments described in relation to Tables 1 to 3 and FIGS. 2 to 11 may be in the PAI regime.

In the PAI regime the focused laser beam acts as a spatially confined, intense heat source. Targeted material is heated up rapidly, eventually causing it to be vaporized. Without wishing to imply any limitation to the scope of protection, the targeted material could be referred to as being boiled away. An advantage of this approach is that it may enable rapid removal of relatively large amount of target material. However, the peripheral heat affected zone (HAZ) damage and the presence of some recast material after processing present limitations in terms of heat confinement for precision laser materials engineering.

In the PAI regime, the laser drives multi-photon absorption of light inside the material. This strips electrons from the material, which then explode away due to Coulomb repulsion. Because PAI involves directly breaking the molecular or atomic bonds that hold the material together, rather than simply heating it, it is intrinsically not a 'hot' process. Since the material is removed in a very short timeframe, the ablated material carries away most of the energy before heat can spread into the surrounding material. These effects may result in a significantly reduced HAZ. Furthermore, this is a clean process and may leave minimal recast material, thereby eliminating the need for elaborate post-processing. The PAI mechanism is compatible with a very broad range of materials, including high band-gap materials that have low linear optical absorption and therefore are difficult to engineer with existing techniques. The PAI mechanism can be considered 'wavelength neutral'; that is, nonlinear absorption can be reduced even if the material is normally transmissive at the laser wavelength.

The PAI mechanism should fundamentally allow for custom design of electron work function of surfaces.

The PTI and PAI mechanism are illustrated schematically in FIGS. 37a and 37b respectively.

It is a further feature of embodiments that the characteristics of the pulsed radiation that is applied to the surface, for example the use of pulse durations in the picosecond range or less, are such that the periodic structures that are formed may be of shallower depth and/or more gently sloped than features formed using pulsed radiation of higher energy and/or longer duration for example pulse durations in the nano-second range.

Again, without wishing to be bound by theory, and without limitation to the scope of protection, the following comments are provided which relate to processes which may occur in relation to at least some embodiments.

In irradiation at very high intensities (or high irradiance) one is confronted with the issue of a dense, strongly absorbing material, in the first few tens of nm of which energy at a rate of some $10^{20}$ W/cm$^3$ is liberated. Part of this energy, once randomised, is conducted into the bulk of the material, while part is converted into directed kinetic energy by thermal expansion of the heated layer. Two regimes are distinguished in this respect.

1. Nanosecond pulsed laser interaction which is dominated by the expansion and ablation of material. Here the thermal pressure of the heated layer is sufficient to cause significant compression of the underlying target material.

2. Picosecond pulsed laser interaction (for example in accordance with some embodiments described herein) which is heat conduction dominated since hydrodynamic motion during the pulse duration is negligible (laser pulses here may be 1000 times or more shorter than nanosecond ones). In the picosecond regime the strong heating of the dense material may occur before hydrodynamic expansion of the processed layer has even started. The plasmas produced in this regime may have essentially the same density as the solid target itself. This—upon cooling—leads to the formation of fine structures—in the range from 1 micrometres to 50 micrometres depending on the irradiation parameters—covered with nano-structures.

Using picosecond duration pulsed radiation according to some embodiments can in some cases also cause formation of nano-ripples or other small scale structures on the surface in addition to the larger scale peaks and troughs obtained by scanning the laser beam in an appropriate pattern over the surface. It is possible that such nano-ripples or other small scale structures may in some cases decrease the PEY or SEY further, in addition to the reduction obtained by larger periodic peak and trough structures. Furthermore, in some cases the nano-ripples or other small scale structures and/or the shallower peaks and troughs associate with picosecond rather than nanosecond pulses may also provide improved or alternative electrical properties of the surface, for example reduced induction, and/or can provide the surface with an increased area at the nano- or micro-scale.

Again, without wishing to be bound by theory, and without limitation to the scope of protection, further comments are as follows.

With increasing surface roughness the maximum SEY may decrease for a surface characterized by valleys, while it may increase significantly at a surface spread with hills. The observation indicates that hill and valley structures may be very effective in increasing and decreasing the SEY, respectively, due to their different morphologic features and surface electron work functions (EWF).

The total SEY may denote the ratio of both emitted true secondary electrons (SEs) and backscattered electrons (BSEs) to primary electrons (PEs) incident to the surface.

Example

Sample surfaces exposed to air can be easily contaminated by adsorbed gases and hydrocarbons, and their SEY may increase.

High SEY caused by contaminations should be likely to give rise to the electron multiplication and eventually degrades the performance of microwave devices and the destructive electron-cloud instability in large particle accelerators.

Increase in SEY indicates the reduction in electron work function [EWF].

With increasing roughness $SEY_{max}$ has a significant increase for surfaces that are spared by hills. This phenomenon implies that hill structures should play a positive role in the SE emission. Moreover, $SEY_{max}$ decreases rapidly by surfaces that are mainly characterized by valleys, which should be the dominant factor of the reduction in $SEY_{max}$.

In the case of valley structures, SEs can be trapped effectively through collisions with sidewalls, thus the SEY declines. Nevertheless, for hill structures, apart from the negative effect of sidewalls, there are some positive effects on SE emission. For example, some PEs strike the local surfaces with hills obliquely, which will induce more SEs than normal incidence. Additionally, SEs are likely to re-enter sidewalls of the hills, resulting in further SEs generations. Most re-entered SEs should be the BSEs those with high energies to overcome the surface potential barrier and generate plenty of true SEs with low energies escaping to the vacuum.

Changes in the electron work function (EWF) induced by different surface morphologies may also be responsible for the SEY variations. The work function may decrease at surface peaks and increases at surface valleys with increasing the surface roughness. Hills and valleys in our structuring work may be considered as surface peaks and valleys. A rougher surface introduced by hill structures often has a lower electron work function (EWF), thus the SEY naturally increases. However, the EWF will be enhanced by roughing a surface with valley structures, and finally the SEY decreases.

It has been found that degreasing of laser-treated samples can result in an increase in SEY of the sample, for example as described in Appendices 3 and 4 below. It has been found that such procedures may result in an increase of SEY that is greater than a decrease in SEY that may have occurred during storage or use of the sample. Although cleaning using an NGL® degreasing product is described in Appendices 3 and 4, any suitable degreasing, cleaning, smoothing or surface carbon reduction process may be used in alternative embodiments. The degreaser may, in some embodiments, be such as to not change substantially the morphology of the sample but may remove a layer of carbon or carbon-containing compounds, mixtures or other materials or other undesired and/or extraneous compounds, mixtures or materials from the surface, for example metal oxides, grease or dirt. For example, in some embodiments 99.7% glacial acetic acid (any other suitable concentration may be used) may be used for example at room temperature to remove surface materials, for example copper (I) and copper (II) oxides and/or other materials without substantially changing the surface morphology.

It will be understood that the present invention has been described above purely by way of example, and modifications of detail can be made within the scope of the invention. Each feature in the description, and (where appropriate) the drawings may be provided independently or in any appropriate combination with any other such feature.

Appendix 1 – A1

| Secondary emission yield (SEY) Report ||
|---|---|
| Client: University of Dundee | Tel.: |
| Job No. S005_SEY_XPS_TE_VSC_2015_08_09 ||
| | Date: 2015-06-09 |

Number of samples: 2

Sample codifications: S005

S005_Cu_2015.06.01_13mm_disc1
S005_Cu_2015.06.01_13mm_disc2

Nature of samples: copper, laser structured. Univ. Dundee – second series
Samples received: 2015-06

Storage after sample measurement: air, paper wrapped, plastic box

Put under vacuum in UHV system: 2015-06-09

Aim of analysis:

- ➤ Secondary emission yield (SEY) – direct measurements on two different systems – Esca5400 and SpecsLab

- ➤ Comparison with previous sample, job no.
  S003_SEY_XPS_TE_VSC_2015_05_07_Laser, sample a SEY measurement conditions
- normal incidence of primary electron beam
- negative 45V bias on the sample (Specslab – Faraday cup method)
- negative 18V bias on the sample (Esca5400 – collector around the sample)
- pressure range 9E-10—2E-9mbar
- primary energy range: 0 – 1800eV
- electron beam size of approx. 1.5 mm, both systems

Appendix 1 – A2

Figure 25:
FIG. 25 shows images of two samples before performance of measurements as outlined in Appendix 1.

Figure 25 shows a picture of the "as received" samples disc 1 and disc 2, with the approximate areas of their measurements on SpecLab system.

Figure 26:
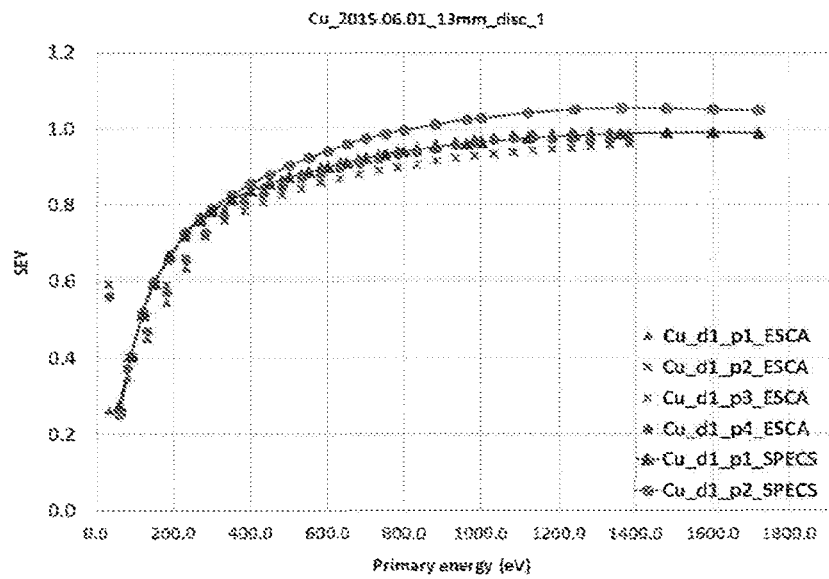
FIGS. 26 and 27 are plots of SEY as a function of primary energy for the samples of FIG. 25.
Figure 27:
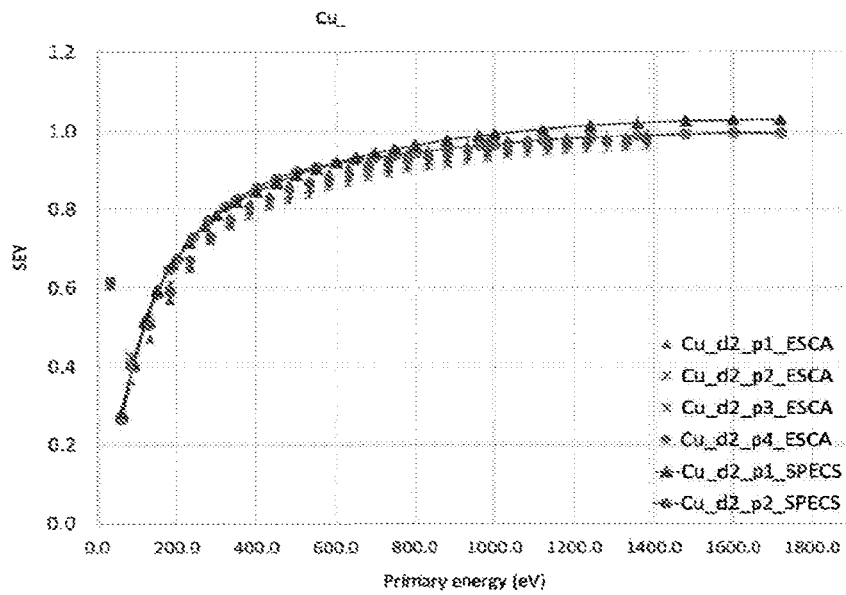

Figures 26 and 27 present the result of the SEY coefficient as a function of primary electron energy, for the two samples, on each SEY system.

Comments

A crosscheck SEY measurement was performed on two SEY measuring systems (see Figures 2 and 3). The discs, with dimensions of 1.3 cm in diameter, were fixed on the sample holder with a single screw on the very edge, in order to minimize the surface damage.

On one system, the samples were measured on four random points, while on the second system the regions of interest were located as shown in Figure 1.

For ESCA540 0 we used a collector to determine the primary current, while the other SpecsLab system used a Faraday cup of 2mm aperture, positively biased. In both cases the samples were biased negatively. The irradiating dose of impinging electrons was kept below $1E-7 C/mm^2$ in order to avoid the conditioning of the samples.

Results

Figure 25 – S005_Cu_2015.06.01_13mm_disc 1 and disc 2 as shown picture of the two samples before the measurements in the centre of the indicated regions, for the SpecsLab system (2 points: Cu_d1_p1 and Cu_d1_p2)

Obs: on Esca5400, the 4 points of measure –Cu_d1_p1 to p_4, were taken randomly on the surface This page is intentionally left blank

Appendix 1 – A4

Conclusions

The two samples do not show a significant dispersion of the maximum SEY coefficients, which are lower than that of a typical clean flat copper, exposed to air.

Appendix 3 – A1

| Secondary emission yield (SEY) Report ||
|---|---|
| Client: University of Dundee | Tel.: |
| Job No. 671_SEY_XPS_TE_VSC_2015_11_10 ||
| | Date: 2015_11_10 |
| <br>Number of samples: 2<br><br>Sample codifications<br><br>- 670: Cu_2015.11.10_2x12cm_stored<br>- 671: Cu_2015.11.10_2x12cm_degreased<br><br>Nature of samples<br><br>- 670: LESS Cu-OFE Strip 1 Stored<br>- 671: LESS Cu-OFE Strip 1 Degreased in NGL<br><br>Samples received at CERN: 2015-06-24<br><br>Storage after sample measurement: air, paper wrapped, plastic bag<br><br>Put under vacuum in UHV system: 2015-1-10<br><br>Aim of analysis:<br><br>➢ Secondary emission yield (SEY) – direct measurements on Warm SEY<br><br>➢ Analysis of the composition by means of XPS characterization on ESCA5400<br><br>➢ Comparison with previous sample, job no. 651_SEY_XPS_TE_VSC_2015_06_25<br><br>SEY measurement conditions<br><br>- Collector around the sample. Current is measured in the sample (Is) and in the collector (Ic)<br>- normal incidence of primary electron beam<br>- negative 18V bias on the sample<br>- positive 45V bias on the sample<br>- pressure 2E-9 mbar<br>- primary energy range: 0 – 1600eV<br>- electron beam size of approx. 1.5 mm | |

Appemdix 3 –A2

Comments

Fig 28a shows the "as received" sample (Cu-OFE 120x20x1 strip 1), placed on the sample holder, and prepared for SEY measurements on Warm SEY system. This sample, which was measured the 25$^{th}$ of June as 651_SEY_XPS_TE_VSC_2015_06_25, will be considered as the reference sample.

This trip was stored in Al foil for 5 months. After this time: 1) the same piece (left-hand side piece in Fig. 28b was measured for assessing the effect of the time storage on the SEY coefficient (670_SEY_XPS_TE_VSC_2015_11_10); 2) a different piece of the same strip was cut and sent to the chemical workshop for a NGL degreasing (right-hand side piece in Fig. 28b) It is worth mentioning the colour difference observed after the chemical treatment. After the chemical cleaning, SEY was measured (671_SEY_XPS_TE_VSC_2015_11_10) for this sample.

Figure 28:
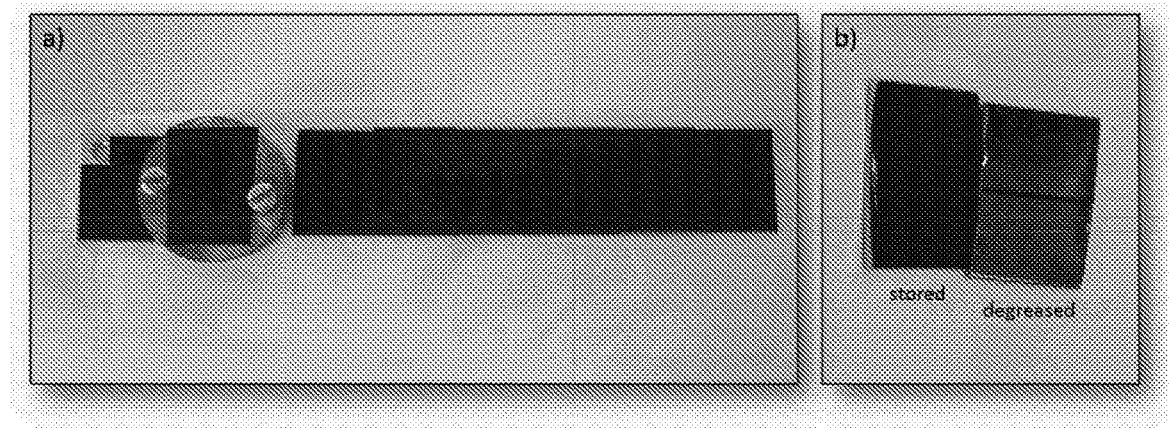
FIGS. 28a and 28b show images of samples before and after degreasing as described in Appendix 3.

Figure 28 shows details of the a) "as-received" sample mounted on the sample holder for SEY measurement; b) samples measured after 5 months of storage (left-hand side) and after performing a NGL chemical degreasing (right-hand side).

SEY measurements were performed on (2x2) cm pieces, cut from one of the originally (12x2) cm strips (Fig. 28a and 28b). The sample was fixed in two points on the very edge, in order to minimise the surface damage.

For the Warm SEY system we determine the SEY ($\delta$) by measuring the current in the sample (Is) and at the collector (Ic) simultaneously by means of two different 6517B Keithley pico-ammeters. The SEY was calculated following the formula:

$$\delta = \frac{Ic}{Ip} = \frac{Ic}{Ic + Is}$$

The sample was biased negatively at -18V while the collector is biased positively at +45V. The irradiating dose of impinging electrons was kept below $10^{-7}$C/mm$^2$ in order to avoid the conditioning of the samples.

Appendix 3 – A3

Results

Figure 29:
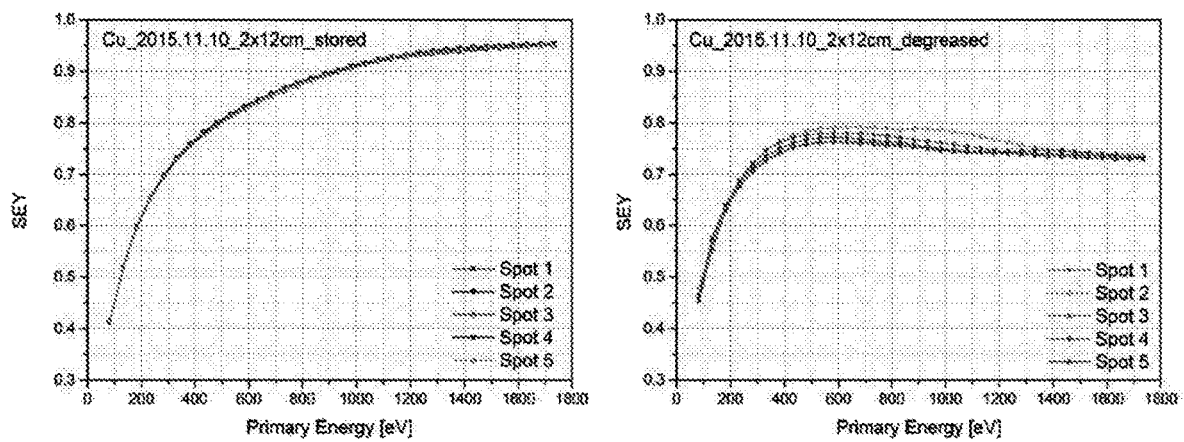
FIGS. 29 to 32 are plots of measurements performed on samples before and after storage and/or degreasing, as described in Appendix 3.

Fig. 29 presents SEY as a function of the primary electron energy for the five different points across the surface for each sample, on orthogonal x and y directions, maintaining constant the distance between the electron gun and the sample for the sample stored (left-hand side) and for the one degreased in NGL (right-hand side).

Figure 29 shows – Cu_2015.10.11_2x12cm_stored (left), and Cu_2015.10.11_2x12cm_degreased (right) SEY as a function of the primary energy on 5 random points of each sample.

Figure 30:
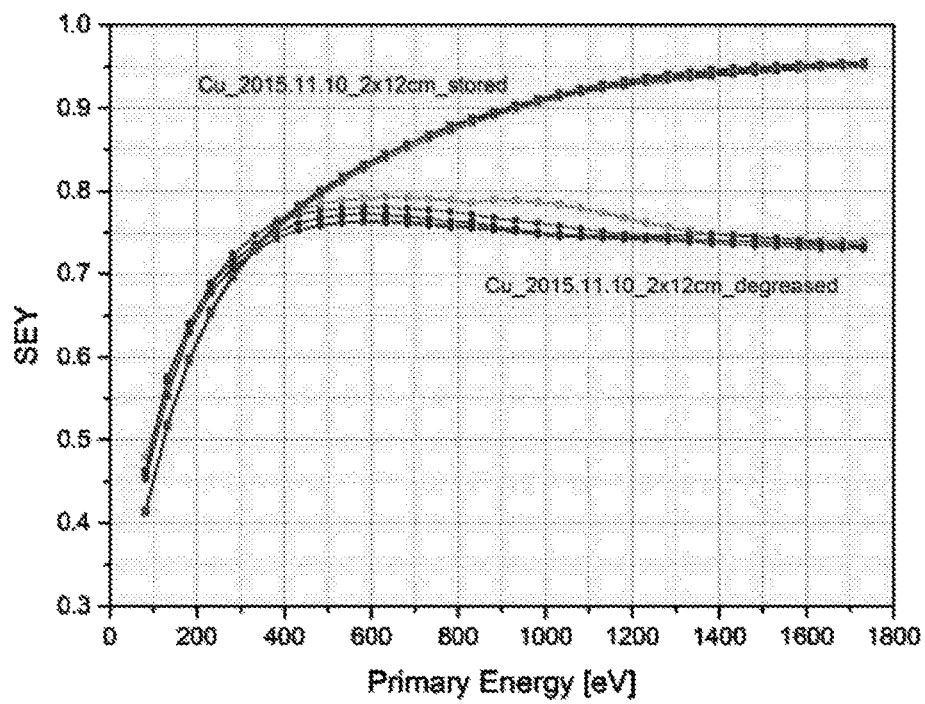

For a better understanding of the chemical cleaning effect on SEY, both curves have been plotted together (Fig. 30). Note that both samples have been stored for 5 months before measuring. It can be clearly seen the effect of the degreasing on the reduction of the maximum SEY (from 0.95 to 0.75 approx.).

Figure 30 shows – SEY Comparison of samples Cu_2015.10.11_2x12cm_stored (red lines) and Cu_2015.10.11_2x12cm_degreased (green lines)

Appendix 3 – A4

Figure 31A:
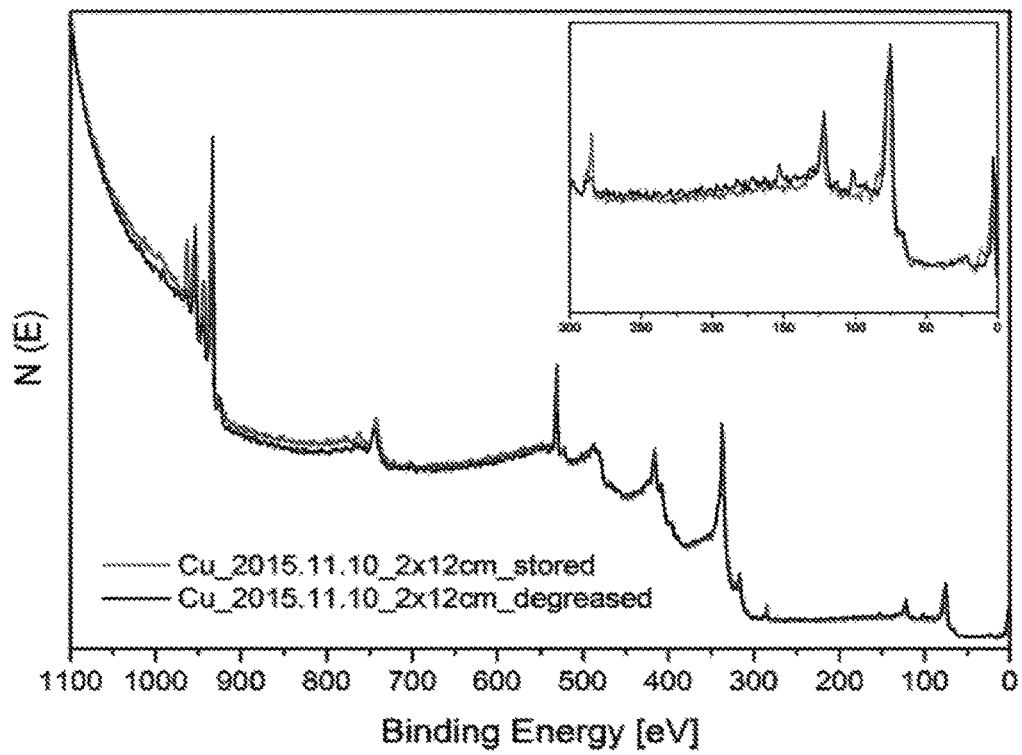
Figure 31B:
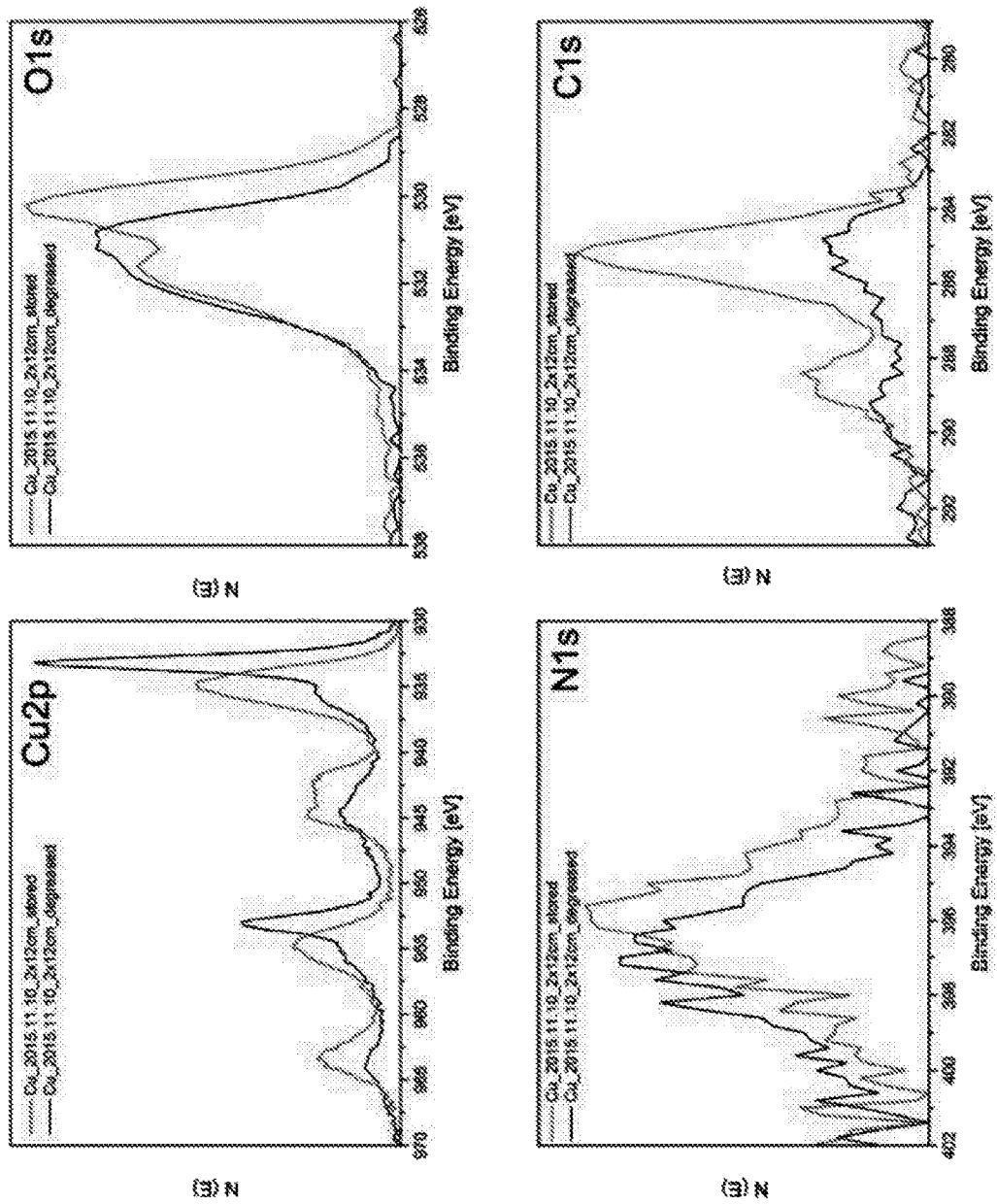

In addition to SEY measurements, an XPS analysis has been done for each sample to establish qualitative and quantitative differences (in terms of surface composition) between them. Fig 31 shows a comparison of the XPS survey measured on both samples. Furthermore, a more accurate comparison of each element (i.e. Cu, O, N and C) is included in the lower part of Fig. 31.

Figure 31 shows – XPS analysis comparison of samples Cu_2015.10.11_2x12cm_stored (red line) and Cu_2015.10.11_2x12cm_degreased (green line).

Appendix 3 – A5

Table 1 presents the surface relative composition, extracted from the XPS results, for both samples. It is worth mentioning the reduced quantity of C 1s is measured in the degreased sample (i.e. 7.8%).

|       | Cu_2015.10.11_2x12cm_stored | Cu_2015.10.11_2x12cm_degreased |
|-------|-----------------------------|--------------------------------|
| Cu 2p | 37.9%                       | 45.0%                          |
| O 1s  | 38.3%                       | 37.1%                          |
| N 1s  | 9.0%                        | 10.1%                          |
| C 1s  | 14.8%                       | 7.8%                           |

Figure 32:
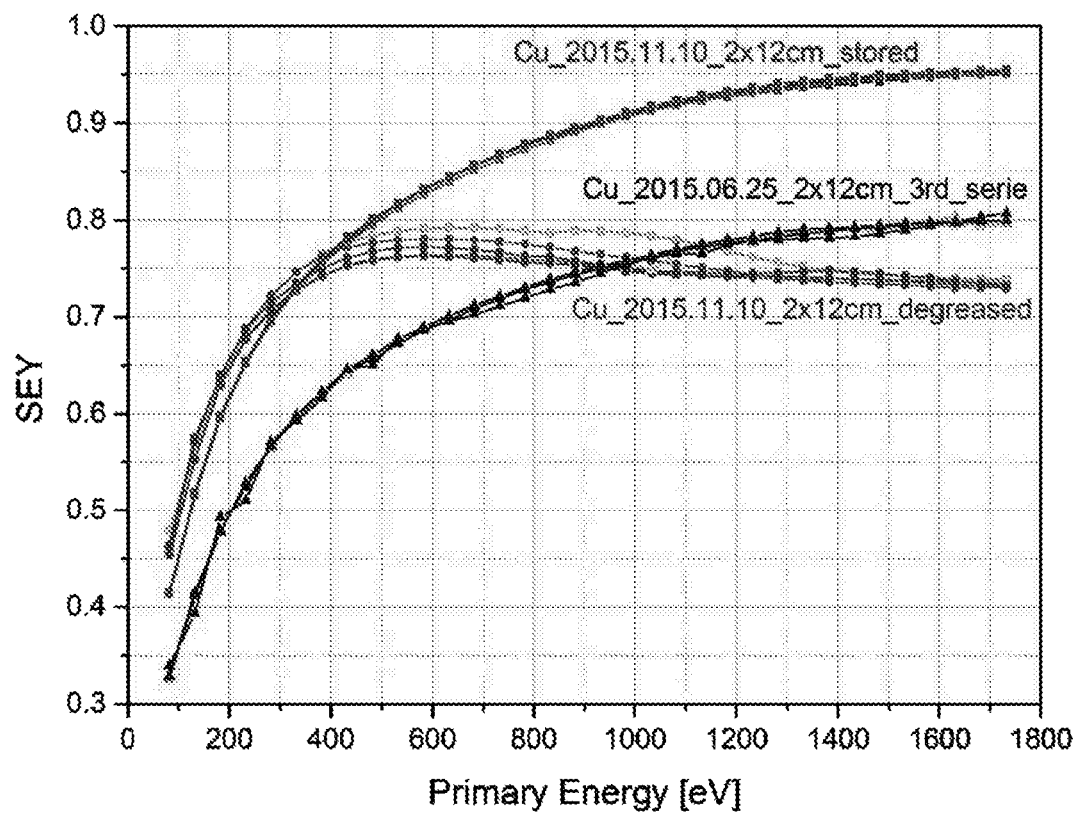

Finally, the SEY coefficients of the two stored samples are compared to the reference one (i.e. Cu_2015.06.25_2x12cm_3$^{rd}$_serie) in Fig. 32. According to this comparison it can be corroborated the effect of the sample storage in air, which provokes an increase of the SEY signal (from 0.8 to 0.95 approx.). On the other hand, the cleaning of the sample after 5 months of storage changes notoriously the shape of the SEY curve, reducing the maximum SEY value down to 0.75-0,8.

Figure 32 shows - Evolution of SEY coefficient as a function of the primary energy for the three different samples: reference (blue lines), stored (red lines), degreased after storage (green lines).

Appendix 3 – A6

Conclusions

- The storage of the Cu-OFE sample during 5 months provokes an increase of the SEY value from 0.8 to 0.95 approximately.
- Even when the sample has been stored for 5 months, if it is properly cleaned by a NGL degreasing method, the SEY coefficient is significantly reduced down to values even lower than the one measured on the reference sample, up to 0.75- 0.8. The shape change of the SEY curve might be related to the reduction of the surface roughness due to the chemical cleaning, which also produces a change in the sample colour, as shown in Fig. 1b.
- In all cases, surfaces are homogeneous, from the SEY dispersion point of view, being the degreased sample the one with a higher dispersion.
- In terms of surface composition, the use of NGL solution reduces significantly the concentration of C in the surface.
- In conclusion it can be said that the <u>NGL</u> degreasing procedure <u>reduces the SEY coefficient,</u> maintaining it in the <u>range of 0.8.</u> This cleaning method reduces significantly the level of C in the sample and provokes a smoothing of the surface (as confirmed by the different colour observed after degreasing, shown in Fig. 28b), which turns into a SEY curve with a maximum peak located in the range of 500 eV.

Appendix 4 – A1

1. Introduction

Colour variations in LESS specimens during sample preparation (cleaning process with ethanol) were noticed visually during previous studies. A colour change could be related with removal of dust on the surface.

1.1 Aim of the study

To check the possible detachment of powdery material, a preliminary study was performed in one LESS sample made of Cu-OFE. It was cut in 5 specimens that were exposed to different cleaning processes and differences on the surface texture were studied by optical and electrical microscopy.

1.2 Key words

OM, SEM, US

2. Protocol 2.1 Samples

Figure 33:
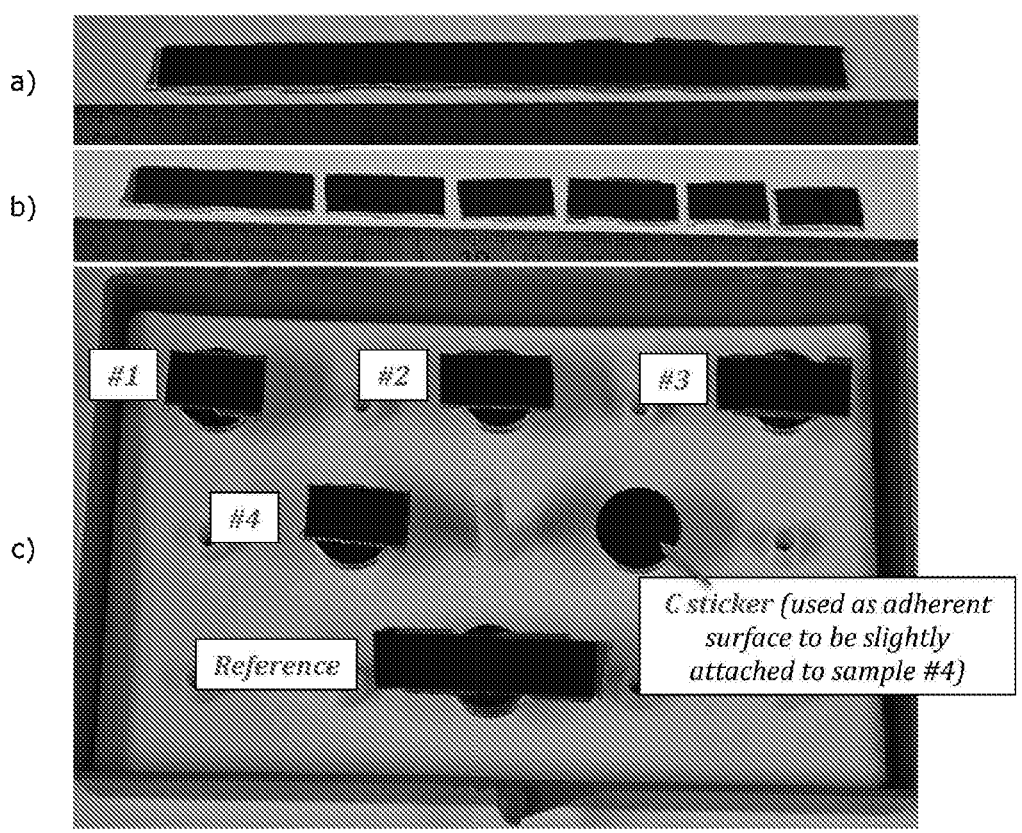
FIG. 33 shows images of samples that are the subject of Appendix 4.

The specimens were cut out from a Cu-OFE LESS sample as shown in Figure 33.

Figure 33 shows – Visual observations of a) Cu-OFE LESS sample as received, b) after cutting and c) Specimen identification.

Appendix 4 – A2

2.2 Equipment

- Scanning Electron Microscope (SEM), field emission gun Feg Sigma (ZEISS) with InLens (Secondary Electron), Evan-Thornley Secondary Electron (SE2), and back-scattered electron (AsB) detectors for Imaging.

- 50 mm2 X Max EDS detector (Oxford), INCA software.

- Digital microscope KEYENCE VHX 1000

3. Experimental work and results

The specimens were cleaned with various procedures as summarized in Table 1, In the specific case of sample #4, the cleaning process consisted in slightly attaching and removing a carbon sticker to the specimen surface. The carbon sticker was also observed at high resolution to check the presence or not of particles attached to its surface.

Table 1 – Cleaning process of each specimen

| Sample | Cleaning Process | Time/Temperature |
|---|---|---|
| Reference | - | - |
| #1 | Ultra sounds on ethanol bath | 1 min/RT |
| #2 | Ultra sounds on ethanol bath | 5 min/RT |
| #3 | Blowing with Pressure air | 1 min/RT |
| #4 | Adheret carbon sticker in contact with the surface | - |

3.1 Optical observation before and after cleaning

Optical microscope observation was performed in the same area of each specimen with same microscope parameters (light, magnification, focus...) before and after the designed cleaning process. Summary of observations are displayed in Figure 2.

Appendix 4 – A3

Figure 34:
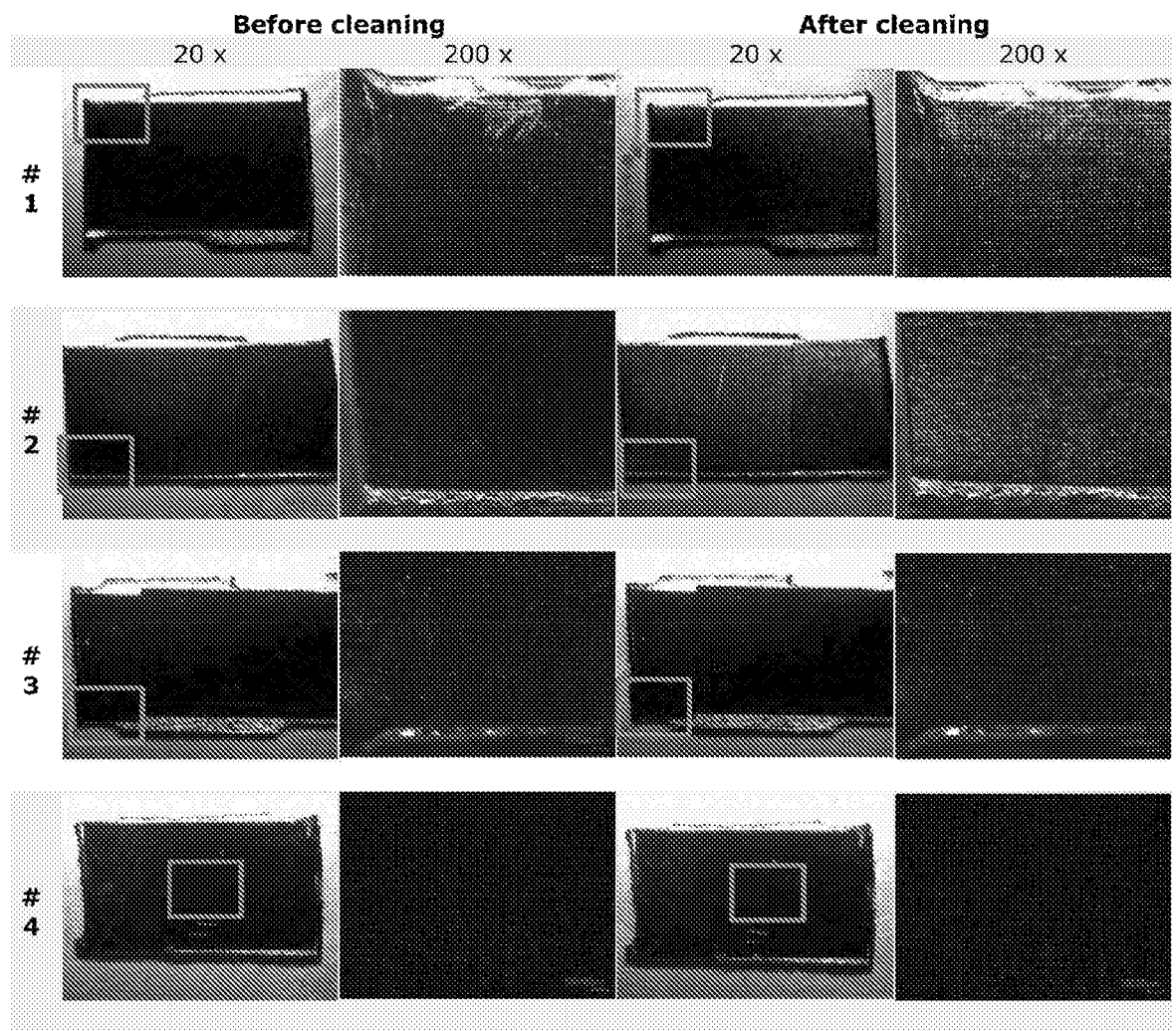
FIG. 34 shows optical microscope images of samples that are the subject of Appendix 4.
Figure 35:
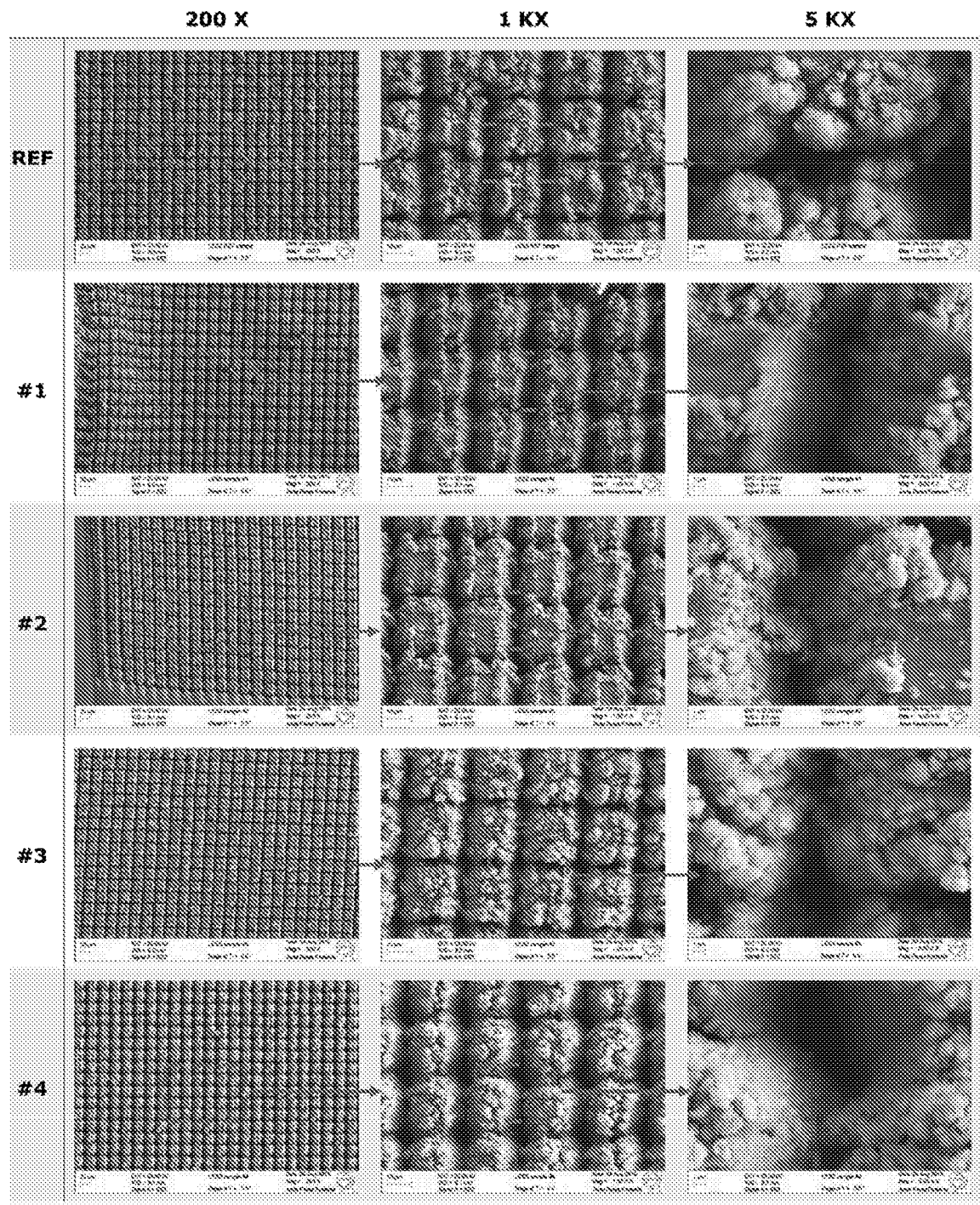

Figure 34 shows – Summary of the optical microscope observation of various specimens before and after cleaning.

3.2 SEM observation after cleaning

The SEM observation was performed in approximately the same areas as for the OM observation, and a reference one was also observed (see figure 34).

The carbon sticker used as adherent surface was also observed and SEM images are shown in Figure 34. Particles (cauliflower structures) from LESS surface were attached to the sticker after slight contact between both areas.

Appendix 4 – A5

Figure 36 shows – SEM SE2 images of carbon sticker surface where characteristic cauliflower observed in LES surface are visible.

4. Summary of observations

- Specimens subjected to ultra-sounds cleaning on ethanol presented a reduction of particles (cauliflower structures) attached to the peaks ridges, independently of the used time (1 or 5 min);
- No clear changes were observed with respect to the reference sample in the case of sample #3 cleaned with pressure air for 1 min;
- In the same way, no major changes were detected on sample #4 where a carbon sticker was slightly attached to the surface (as cleaning process).
- Nevertheless, the SEM observation of the sticker confirmed the presence of few particles (up to 3 µm) easily separated from sample #4.

The invention claimed is:

1. A method of reducing photoelectron yield (PEY) and/or secondary electron yield (SEY) of a surface of a target, comprising:
applying laser radiation to the surface of the target to produce a periodic arrangement of structures on the surface, wherein
the laser radiation comprises pulsed laser radiation comprising a series of laser pulses and the power density of the pulses is in a range 0.01 TW/cm$^2$ to 3 TW/cm$^2$;
the applying of the laser radiation is such as to alter the properties of surface such that the surface has a value of SEY less than 1.5;
at least some of the laser pulses have a duration less than a thermal relaxation time of the material of the surface;
the laser radiation comprises a pulsed laser beam that has a focal spot diameter on the surface in a range 1 μm to 100 μm and the pulsed radiation has a pulse repetition rate in a range 10 kHz to 1 MHz and an average power of the laser radiation is in a range 0.3 W to 20 W.

2. A method according to claim 1, wherein the power density is in a range 0.1 TW/cm$^2$ to 2 TW/cm$^2$.

3. A method according to claim 1, wherein the applying of the laser radiation is such as to alter the properties of the surface such that the surface has a value of SEY less than 1.2.

4. A method according to claim 1, wherein a pulse duration of the laser pulses is in a range 200 femtoseconds (fs) to 1000 picoseconds (ps).

5. A method according to claim 1, wherein the periodic arrangement of structures on the surface comprises a periodic series of peaks and troughs substantially parallel to each other.

6. A method according to claim 1, wherein the peak to trough distance for at least some of the peaks, and/or an average or median peak to trough distance, is in a range 0.5 μm to 100 μm.

7. A method according to claim 1, wherein the periodic arrangement of structures comprise a cross-hatched arrangement or an arrangement of parallel lines of peaks and troughs substantially without cross-hatching.

8. A method according to claim 1, comprising performing a single pass of the laser source across the surface to produce the periodic arrangement of structures.

9. A method according to claim 1, wherein the laser radiation comprises a pulsed laser beam that has a focal spot diameter on the surface in a range 1 μm to 50 μm.

10. A method according to claim 1, wherein an average power of the laser radiation is in a range 0.3 W to 5 W.

11. A method according to claim 1, wherein the applying of the laser radiation to the surface comprises scanning a pulsed laser beam over the surface, and a scan speed for the scanning is in a range 1 mm/s to 200 mm/s.

12. A method according to claim 1, wherein the scanning of the pulsed laser beam over the surface is repeated between 2 and 10 times, or is performed once.

13. A method according to claim 1, wherein an angle of incidence of the laser radiation to the surface is in a range from 0 to 30 degrees or from 90 degree to 60 degrees.

14. A method according to claim 1, wherein a wavelength of the radiation is in a range 100 nm to 2,000 nm.

15. A method according to claim 1, wherein the applying of the laser radiation to the surface is such as to produce further periodic structures, and the further periodic structures are smaller than the structures of said periodic arrangement of structures.

16. A method according to claim 15, wherein the further periodic structures are ripples or nano-ripples.

17. A method according to claim 15, wherein the further periodic structures comprise laser induced periodic surface structures (LIPPS).

18. A method according to claim 15, wherein the further periodic structures have a periodicity in a range 10 nm to 1 μm, optionally in a range 100 nm to 1 μm.

19. A method according to claim 15, wherein the further periodic structures cover at least part of the periodic array of structures and/or are formed in the troughs and/or on the peaks of the periodic arrangement of structures.

20. A method according to claim 1, wherein the surface comprises a metal surface.

21. A method according to claim 1, wherein the surface forms part of, or comprises a surface of a component of, at least one of a particle accelerator, a beamline, a waveguide, an r.f. waveguide, a detector, a detector apparatus, a spacecraft, a vacuum chamber.

22. A method according to claim 21, comprising:
applying the laser radiation to the surface to produce the periodic arrangement of structures on the surface and then installing the component in the apparatus; or
applying the laser radiation to the surface with the component in situ in the apparatus.

23. A method according to claim 1, comprising applying the radiation using a solid-state laser.

24. A method according to claim 1, further comprising at least one of degreasing, cleaning or smoothing said surface after the applying of the laser radiation, and/or performing a surface carbon reduction process with respect to said surface after the applying of the laser radiation.

25. A laser treated surface comprising a periodic arrangement of structures on the surface formed using a method according to claim 1.

* * * * *

UNITED STATES PATENT AND TRADEMARK OFFICE
CERTIFICATE OF CORRECTION

| | | |
|---|---|---|
| PATENT NO. | : 11,033,985 B2 | |
| APPLICATION NO. | : 15/739062 | |
| DATED | : June 15, 2021 | |
| INVENTOR(S) | : Amin Abdolvand | |

It is certified that error appears in the above-identified patent and that said Letters Patent is hereby corrected as shown below:

On the Title Page

Item (30) Foreign Application Priority Data:
Please correct "1511153" to read -- 1511153.7 --
Please correct "1511154" to read -- 1511154.5 --

Item (30) Foreign Application Priority Data, Page 2, Column 1:
Please correct "1517232" to read -- 1517232.3 --
Please correct "1517235" to read -- 1517235.6 --
Please correct "1603991" to read -- 1603991.9 --

In the Specification

Column 9, Line 41:
Please correct "1 to 50 μm" to read -- 1 μm to 50 μm --

Signed and Sealed this
Fifth Day of July, 2022

Katherine Kelly Vidal
*Director of the United States Patent and Trademark Office*